United States Patent [19]

Okamoto et al.

[11] Patent Number: 5,506,713
[45] Date of Patent: Apr. 9, 1996

[54] OPTICAL SWITCHING SYSTEM

[75] Inventors: Manabu Okamoto, Yokohama; Kenichi Ohtsuki, Kanagawa; Yoshito Sakurai, Yokohama, all of Japan

[73] Assignee: Hitachi, Ltd., Tokyo, Japan

[21] Appl. No.: 460,144

[22] Filed: Jun. 2, 1995

Related U.S. Application Data

[62] Division of Ser. No. 118,462, Sep. 9, 1993.

[30]    Foreign Application Priority Data

Sep. 9, 1992   [JP]   Japan .................................. 4-240975
Feb. 8, 1993   [JP]   Japan .................................. 5-020018

[51] Int. Cl.$^6$ .................................. H04B 14/00; H04B 14/02
[52] U.S. Cl. .................................. 359/123; 359/117; 359/123; 359/128; 359/140; 359/165
[58] Field of Search .................................. 359/123, 117, 359/147, 128, 165, 140

[56]    References Cited

U.S. PATENT DOCUMENTS 5,194,977   3/1993   Nishio .................................. 359/123

Primary Examiner—Leslie Pascal
Attorney, Agent, or Firm—Antonelli, Terry, Stout & Kraus

[57]    ABSTRACT

An optical switching system to which a plurality of input transmission lines and output transmission lines for transmitting optical signals are arranged and connected, and in which fixed length cells transmitted from the input transmission lines are switched based on the routing information contained in the cells and the switched cells are outputted to the output transmission lines includes: optical cell synchronizer portions for detecting the fronts of the cells and synchronizing the fronts of the cells incoming from respective transmission lines; a switching portion for converting respective cells the fronts of which are synchronized to those of different wavelengths by input transmission lines and for switching them based on the routing information in the cells; multiplexer portions for wavelength division multiplexing the cells switched to different wavelengths by input transmission line with respect to respective output transmission lines; demultiplexer portions for splitting cells wavelength division multiplexed in the multiplexer portions by cell and aligning them in a time series, and wavelength converter portions for converting the cells split in the demultiplexer portions to cells having a predetermined single output wavelength.

3 Claims, 23 Drawing Sheets

FIG. 2
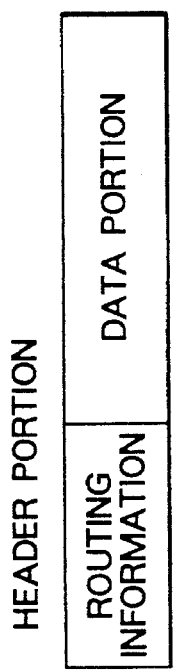
FIG. 3A
FIG. 3B
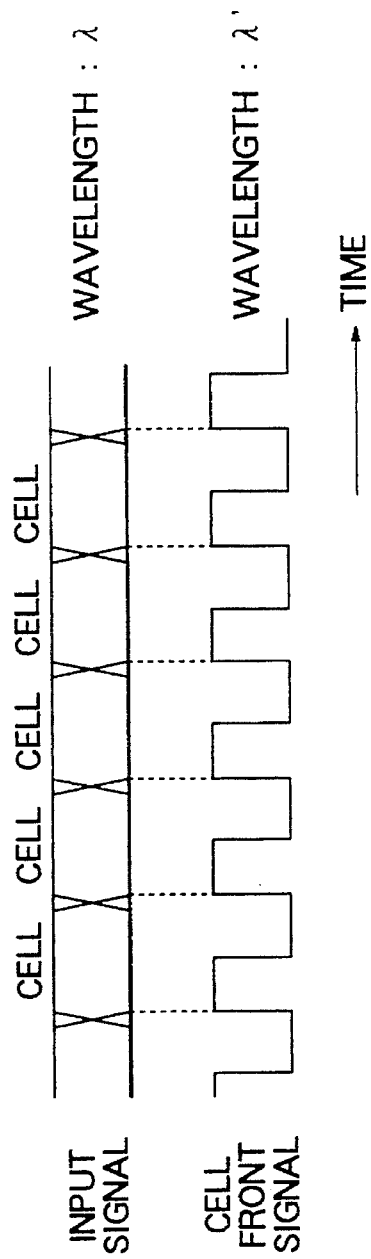

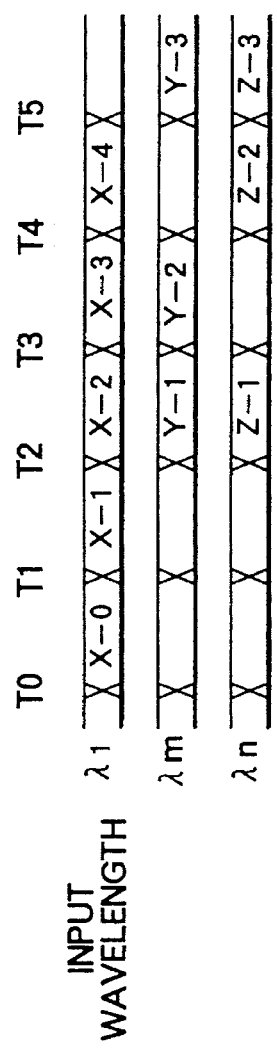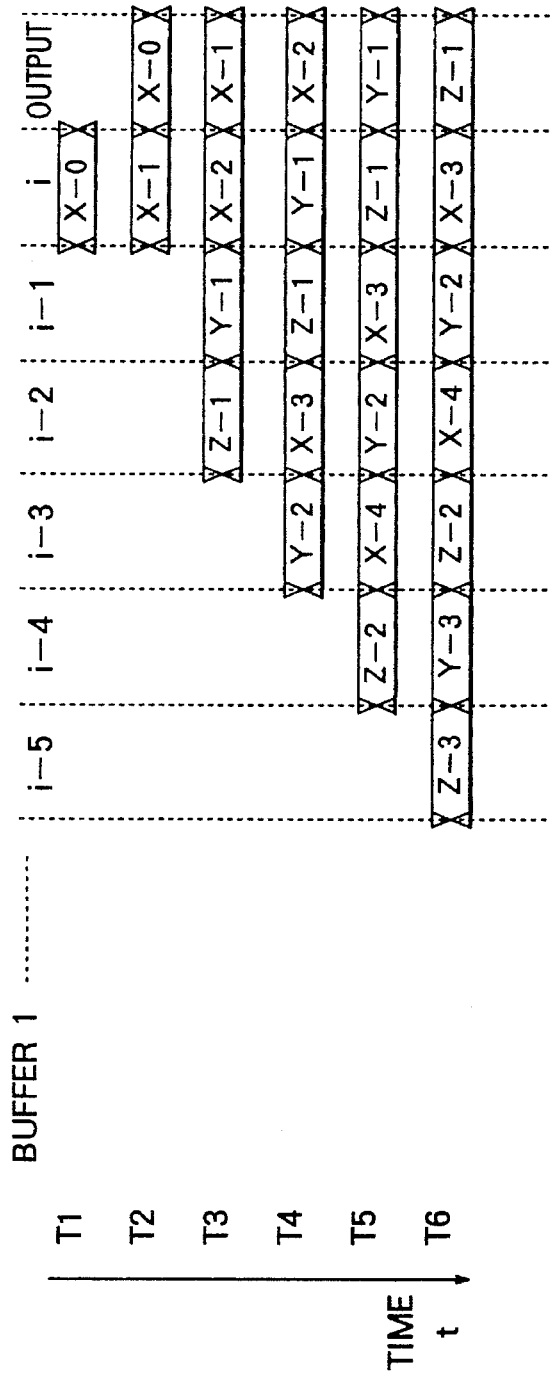

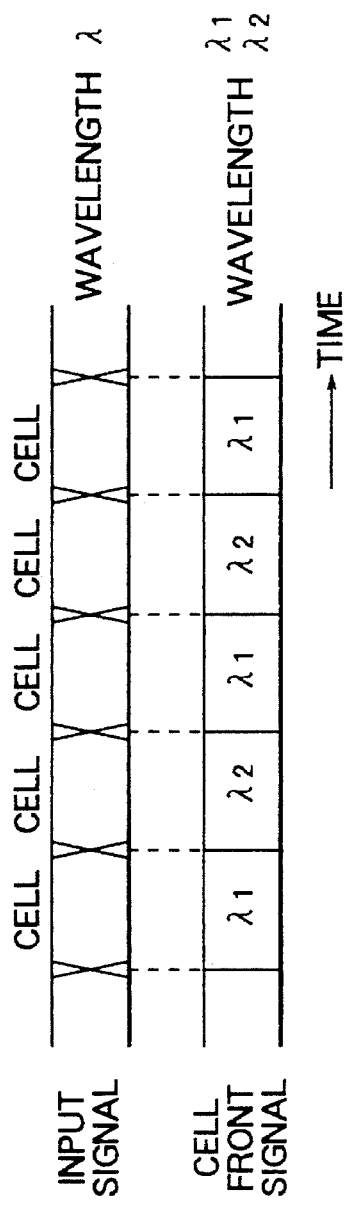
FIG. 12A
FIG. 12B
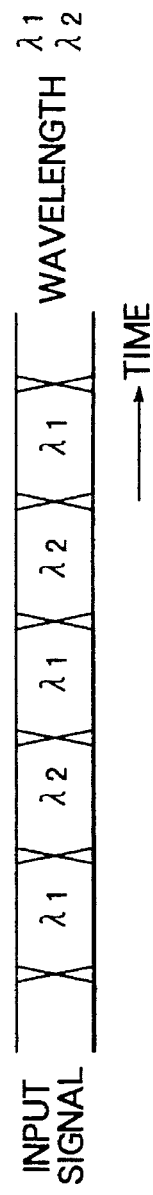
FIG. 13

FIG. 19

| TIME t | BUFFER i SWITCH CONTROL LINE S1 S2 | BUFFER i FILTER 1 CONTROL LINE (F1) | BUFFER i FILTER 2 CONTROL LINE (F2) | BUFFER i-1 S1 S2 | BUFFER i-1 F1 | BUFFER i-1 F2 | BUFFER i-2 S1 S2 | BUFFER i-2 F1 | BUFFER i-2 F2 | BUFFER i-3 S1 S2 | BUFFER i-3 F1 | BUFFER i-3 F2 | BUFFER i-4 S1 S2 | BUFFER i-4 F1 | BUFFER i-4 F2 | BUFFER i-5 S1 S2 | BUFFER i-5 F1 | BUFFER i-5 F2 |
|---|---|---|---|---|---|---|---|---|---|---|---|---|---|---|---|---|---|---|
| T1 | CROSE OFF $\lambda_1$ <X-0> | ALL | | BAR OFF | — | ALL | BAR OFF | — | ALL | BAR OFF | — | ALL | BAR OFF | — | ALL | BAR OFF | — | ALL |
| T2 | CROSE OFF $\lambda_1$ <X-1> | $\lambda_1$ | | BAR OFF | — | ALL | BAR OFF | — | ALL | BAR OFF | — | ALL | BAR OFF | — | ALL | BAR OFF | — | ALL |
| T3 | CROSE OFF $\lambda_1$ <X-2> | $\lambda_1$ | | CROSE ON $\lambda_m$ <Y-1> | $\lambda_1$ | | CROSE OFF $\lambda_n$ <Z-1> | $\lambda_1,\lambda_m$ | ALL | BAR OFF | — | ALL | BAR OFF | — | ALL | BAR OFF | — | ALL |
| T4 | CROSE OFF $\lambda_m$ <Y-1> | $\lambda_1$ | | CROSE OFF $\lambda_n$ <Z-1> | $\lambda_m$ | $\lambda_1$ | CROSE OFF $\lambda_1$ <X-3> | $\lambda_m$ | | CROSE ON $\lambda_1$ <Y-2> | — | ALL | BAR OFF | — | ALL | BAR OFF | — | ALL |
| T5 | CROSE OFF $\lambda_n$ <Z-1> | $\lambda_m$ | | CROSE OFF $\lambda_1$ <X-3> | $\lambda_n$ | $\lambda_m$ | CROSE OFF $\lambda_m$ <Y-2> | $\lambda_1$ | $\lambda_m$ | CROSE OFF $\lambda_1$ <X-4> | $\lambda_1$ | $\lambda_m$ | CROSE ON $\lambda_n$ <Z-2> | — | ALL | BAR OFF | — | ALL |
| T6 | CROSE OFF $\lambda_1$ <X-3> | $\lambda_n$ | | CROSE OFF $\lambda_m$ <Y-2> | $\lambda_1$ | $\lambda_n$ | CROSE OFF $\lambda_1$ <X-4> | $\lambda_m$ | $\lambda_1$ | CROSE OFF $\lambda_n$ <Z-2> | $\lambda_1$ | $\lambda_m$ | CROSE OFF $\lambda_m$ <Y-3> | $\lambda_n$ | $\lambda_1$ | CROSE ON $\lambda_n$ <Z-3> | $\lambda_m$ | $\lambda_n$ |

FIG. 20

| | ROM INPUT | | ROM OUTPUT | | | |
|---|---|---|---|---|---|---|
| | WAVELENGTH $\lambda_1 \lambda_2 \cdots \lambda_m \lambda_n$ | BUFFER NO. 0 1 2 ⋯ i-5 i-4 i-3 i-2 i-1 i | BUFFER i S1 S2 F1 F2 | BUFFER i-1 S1 S2 F1 F2 | BUFFER i-2 S1 S2 F1 F2 | ⋮ |
| T1 | 1 0 0 0 | 000 0 0 0 0 0 0 | 1 0 $\lambda_1$ ALL | 0 0 — ALL | 0 0 — ALL | |
| T2 | 1 0 0 0 | 000 0 0 0 0 0 1 | 1 0 $\lambda_1$ $\lambda_1$ | 0 0 — ALL | 0 0 — ALL | |
| T3 | 1 0 1 0 | 000 0 0 0 0 0 1 | 1 0 $\lambda_1$ $\lambda_1$ | 1 1 $\lambda_m \lambda_1$ | 1 1 $\lambda_n \lambda_1$ $\lambda_m$ | |
| T4 | 1 0 0 1 | 000 0 0 0 1 1 1 | 1 0 $\lambda_m$ $\lambda_1$ | 1 0 $\lambda_n$ $\lambda_m$ | 1 0 $\lambda_1$ $\lambda_n$ | |
| T5 | 1 0 0 1 | 000 0 0 1 1 1 1 | 1 0 $\lambda_n$ $\lambda_1$ | 1 0 $\lambda_1$ $\lambda_n$ | 1 0 $\lambda_1$ $\lambda_1$ | |
| T6 | 0 0 1 1 | 000 0 1 1 1 1 1 | 1 0 $\lambda_1$ $\lambda_m$ | 1 0 $\lambda_1$ $\lambda_1$ | 1 0 $\lambda_1$ $\lambda_m$ | |

1 : WHEN $\lambda_k$ IS INPUT
0 : WHEN THERE IS NO INPUT

1 : WHEN BUFFER IS ACCUMULATING
0 : WHEN BUFFER IS VACANT

1 : WHEN S1 IS IN CROSE
0 : WHEN S1 IS IN BAR

1 : WHEN S2 IS ON
0 : WHEN S2 IS OFF
ALL : ALL WAVELENGTH ARE PASSED

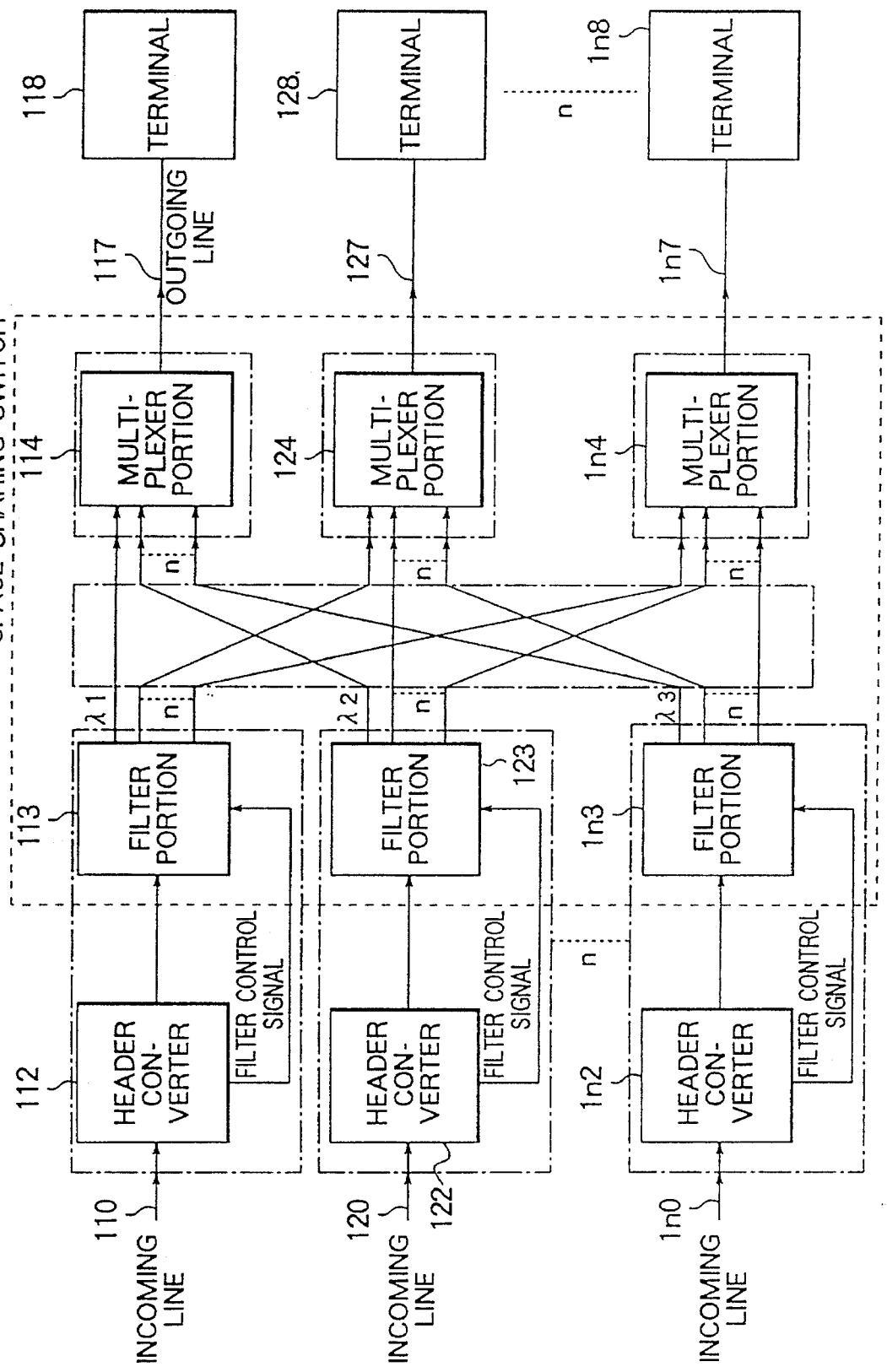

OPTICAL SWITCHING SYSTEM

This application is a Division of patent application Ser. No. 08/118,462, filed Sep. 9, 1993.

BACKGROUND OF THE INVENTION

1. Field of the Invention

The present invention relates to a heat-sensitive recording sheet and more particularly, to a heat-sensitive recording sheet improved in color formability and sticking resistance and excellent in image stabilities such as plasticizer resistance and water resistance and in printability.

2. Related Art

Recently, heat-sensitive recording sheets which form a color by application of heat are widely used for facsimile, word processors, plotter systems, labeling and the like. This is because the printing system comprises forming color images by an instantaneous chemical reaction with heating and has the advantages such as use of small devices, high recording speed, little noise and environmental pollution and low cost. However, in the case of customarily employed heat-sensitive recording systems which use dye precursors and electron-accepting compounds as color forming components, the white portions of the recording sheet sometimes develop color with organic solvents such as toluene and methyl ethyl ketone, and decoloration of the color formed portions sometimes occurs when the sheet comes to contact with a hair dressing, dibutyl mentioned technics, the utilization of not only high speed and wideband characteristics, as distinctive features of optical signals, but also of wavelength division multiplexing technology is possible. In the technics, wavelength are used as routing information, and the signals are converted and classified to wavelength groups corresponding to respective outgoing lines.

Further, an optical ATM switching system having a self-routing switch is proposed in which an input signal of predetermined wavelength having input information is converted to a signal of a wavelength having the routing information and the input information is outputted to a desired output terminal by self-routing based on the routing information contained in the signal of the wavelength, as an optical ATM switching system as shown in JP-A-104148.

In a conventional system as shown in the former well-known example, however, even though wavelengths are used as routing information, degree of multiplexing of a speech path is not upgraded. Therefore, even when wavelength division multiplexing is adopted for upgrading the degree of multiplexing of a speech path, a means for splitting cells from multiplexed data is left out of consideration.

When the cells arriving from respective transmission lines at different times are synchronized, it is considered to utilize optical memories, which requires, however, to monitor the phases of cells from all incoming transmission lines and to synchronize them, so that complicated processes and circuits are needed.

Further, a small-sized and inexpensive optical memory like an electrical memory will not be available for some time to come. Therefore, it is required to use an optical memory or the like efficiently by making the most of the features of optical signals that wavelength division multiplexing may be utilized.

Further, also in the case of JP-A-104148, because of the utilization of wavelengths for routing information, a complicated wavelength detector is needed to discriminate output routes, and a means for splitting cells from wavelength division multiplexed data is not mentioned similarly to the case of the former well-known example.

SUMMARY OF THE INVENTION

In order to solve the above-mentioned problem, the object of the present invention is to provide an optical switching system in which optical ATM cells themselves are wavelength division multiplexed and there is no need to synchronize respective optical cells from respective transmission lines; in other words, an optical switching system in which phase synchronization of cells is not needed.

According to a first aspect of the present invention, there is provided an optical switching system as described hereunder.

An optical switching system in which a plurality of input transmission lines and output transmission lines for transmitting optical signals are arranged and connected, fixed length cells transmitted from the input transmission lines are switched based on routing information contained in the cells and outputting the switched cells to the output transmission lines, comprising: optical cell synchronizer portions for detecting the heads of the cells and synchronizing the heads of the cells from respective transmission lines; switching portions for converting respective cells the heads of which are synchronized to different wavelengths with respect to each input transmission line, and for performing switching of the cells based on the routing information in the cells; multiplexer portions for performing wavelength division multiplexing of cells switched to different wavelengths for each input transmission line with respect to the output transmission lines; demultiplexer portions for splitting respective cells from wavelength division multiplexed cells and for aligning them in line by the time base; and wavelength converter portions for converting the wavelengths of the split cells which are split in the demultiplexer portions to a predetermined single output wavelength.

The optical cell synchronizer portion includes: buffer portions provided in respective transmission lines for delaying the optical cells from respective transmission lines with a plurality of delay loops, each having different delay time; and a synchronization judging portion which inputs delayed optical cells through the plurality of delay loops and detects synchronization positions and instructs respective buffer portions to output.

The optical cell synchronizer portion includes: a plurality of optical signal detector portions provided in respective transmission lines for detecting optical cells from respective transmission lines and informing of the detection of the cells; and a synchronization judging portion for detecting the synchronizing positions of respective optical cells according to the information from the optical signal detector portions and instructing the optical signal detector portions to output. The optical signal detector portion includes an output to be connected to the other optical signal detector portion through a delay line and another output to be connected to the switching portion, and these two outputs can be switched by the instruction from the synchronization judging portion.

The switching portion includes: a routing information detection means for detecting the routing information in the cell; and filter portions being provided corresponding to respective output routes for deciding the output route of the cell based on the routing information in the cell.

The routing information detection means generates oscillation of a predetermined frequency corresponding to the detected routing information, and the filter portion passes a cell when there is found the oscillation of a predetermined frequency corresponding to an output route, and when the oscillation of a frequency other than the predetermined frequency is found the cell is not allowed to pass.

The routing information detection means can be so constituted as to include a decoder portion which outputs the light of predetermined degrees of intensity corresponding to the detected routing information; a portion which generates oscillation of predetermined frequency according to the degree of intensity of the output light; and a filter portion which passes a cell when there is found the oscillation of a predetermined frequency corresponding to an output route and the cell is not allowed to pass when the frequency of the oscillation is other than the predetermined frequency.

The demultiplexer portion includes: a plurality of buffer portions being connected in series which input wavelength division multiplexed cells from the multiplexer portion and output them to two outputs; wavelength filters provided in respective outputs of the plurality of buffer portions and split wavelength division multiplexed cells by wavelengths; and a switch controller portion which analyzes the degree of multiplexing of wavelength division multiplexed cells and instructs the wavelength filter to output based on the result of the analysis. A cell outputted from one output of a buffer portion is inputted to the buffer portion through the wavelength filter and a delay loop, and a cell outputted from another output of the buffer portion is inputted to the other buffer portion or to the wavelength converter portion; and the switch controller portion can instruct the wavelength filter to output wavelength division multiplexed cells one by one.

There can be another constitution of the above-mentioned demultiplexer portion which includes: a plurality of buffer portions being connected in series to which the wavelength division multiplexed cells from the multiplexer portion are inputted and from which the cells are outputted to two outputs, and a wavelength filter for splitting wavelength division multiplexed cells by wavelengths; a filter controller portion for instructing the wavelength filter to perform output operation; and a switch controller portion which analyzes the degree of multiplexing of wavelength division multiplexed cells and instructs the buffer portions to output. A cell outputted from one output of the buffer portion is inputted to the buffer portion through a delay loop, and a cell outputted from another output of the buffer portion is inputted to the other buffer portion or to the wavelength filter; the filter controller portion instructs the wavelength filter and the switch controller portion to output the wavelength division multiplexed cells one by one; and the switch controller portion indicates the output routes of respective buffer portions to output according to the instruction of the filter controller portion.

The optical cell synchronizer portion detects fronts of cells and synchronizes the fronts the cells arriving from respective transmission lines having different phases from each other. For synchronization, the buffer portions provided in respective transmission lines of the optical cell synchronizer portions delay the optical cells transmitted from respective transmission lines in passing them through a plurality of delay loops having different delay times, and the synchronization judging portion detects synchronizing positions and instructs respective buffer portions to output. In another way for synchronization, the optical signal detector portions provided in respective transmission lines of the optical cell synchronizer portion detect the cells from respective transmission lines and informs of the detection; the synchronization judging portion detects the synchronization positions of respective optical cells according to the information from the optical signal detector portions and instructs the optical signal detector portions to output. The output of the optical signal detector portion is switched to be output from the line connected to the other optical signal detector portion through a delay line or from the line connected to the switching portion by the instruction from the synchronization judging portion.

The routing information detection means of the switching portion takes out the routing information contained in the cells and generates oscillation of predetermined frequency corresponding to the detected routing information, and supplies the information to the filter portion. In the filter portion, the cell is passed when there is the oscillation of a predetermined frequency, and the cell is not allowed to pass when the frequency is other than the predetermined frequency; thus, the filtering of cells is performed according to the routing information.

In the multiplexer portion, the cells arriving from a plurality of filter portions are wavelength division multiplexed.

In the demultiplexer portion, a cell outputted from one output of the buffer portion is inputted to the buffer portion through the wavelength filter and a delay loop, and a cell outputted from another output of the buffer portion is inputted to the other buffer portion or to the wavelength converter portion through the wavelength filter portion; the switch controller portion instructs the wavelength filter to output the wavelength division multiplexed cells one by one.

When the other constitution is adopted, following operations are performed: a cell outputted from one output of the buffer portion is inputted to the buffer portion through a delay loop, and a cell outputted from another output of the buffer portion is inputted to the other buffer portion or to the wavelength filter; the filter controller portion instructs the wavelength filter and the switch controller portion to output the wavelength division multiplexed cells one by one; and the switch controller portion indicates respective buffer portions the routes to output according to the instruction from the filter controller portion.

As described in the above, wavelength division multiplexed cells are split into a cell train in line by the time base, and they are converted to have a single output wavelength in the wavelength converter portion.

According to a second aspect of the present invention, there is provided an optical switching system such as described hereunder.

An optical switching system in which a plurality of input transmission lines and output transmission lines for transmitting optical signals are connected with one another, and the cells are switched based on the routing information contained in fixed length cells transmitted from the input transmission lines and are outputted to the output transmission lines includes a switching portion having: routing information detecting means for detecting the routing information of the cells; optical cell synchronizer portions for synchronizing the heads of the cells from respective transmission lines after detecting the routing information; and filter portions being provided corresponding to an output route and determining an output route of the cell based on the detected routing information; and further includes: multiplexer portions for performing wavelength division multiplexing of the cells outputted from respective switching portions with respect to each output route; demultiplexer portions for splitting respective cells from wavelength division multiplexed cells in the multiplexer portions; and wavelength converter portions for converting the wavelengths of the cells which are split in the demultiplexer portions to a predetermined single output wavelength.

According to a third aspect of the present invention, there is provided an optical switching system such as described hereunder.

An optical switching system, in which a plurality of input transmission lines and output transmission lines for transmitting optical signals are connected, fixed length cells transmitted from the input transmission lines are switched based on the routing information contained in the cells without synchronizing the optical cells arriving at different times through respective transmission lines and outputted to output transmission lines, includes: header converter portions as means for taking out the routing information of the header portions, and for controlling wavelength filter portions in accordance with the information so as to output the cells to output routes; multiplexer portions as means for performing wavelength division multiplexing of a plurality of cells having different wavelengths and different phases arriving at the output routes from the plurality of wavelength filter portions; and demultiplexer portions (DMX portions) as means for realigning wavelength division multiplexed cells in line by the time base irrespective of the wavelengths.

Namely, the optical switching system which performs switching of fixed length cells transmitted from input transmission lines and output transmission lines for transmitting optical signals based on the routing information contained in the cells and outputs them to output transmission lines includes: header converter portions for detecting the routing information of the cells and deciding their output routes; filter portions in which only a filter which corresponds to a desired output route is controlled to be through based on the routing information; multiplexer portions for wavelength division multiplexing cells outputted from respective filter portions without synchronizing the cells; demultiplexer portions for splitting respective cells from wavelength division multiplexed cells in the multiplexer portions; and wavelength converter portions for converting the wavelengths of the split cells which are split in the demultiplexer portions to a predetermined single output wavelength.

The header converter portion takes out routing information contained in the cells and generates oscillation of predetermined frequency corresponding to the detected routing information, and supplies the information to the wavelength filter portion. In the wavelength filter portion, when there is found an oscillation of a predetermined frequency corresponding to the output route, the cells are passed and when the frequency is other than the predetermined frequency, the cells are not allowed to pass; thus the cells are filtered according to the routing information.

In the multiplexer portion, the cells arriving from a plurality of wavelength filters having different wavelengths and phases are wavelength division multiplexed.

The demultiplexer portion (hereinafter referred to as the DMX portion) is composed of a control portion and a plurality of cell demultiplexer portions. In the cell demultiplexer portion, it is possible to split a designated cell from wavelength division multiplexed cells. The control portion detects a cell which arrives at the DMX portion at the earliest time out of the cells which are wavelength division multiplexed being accumulated in a plurality of cell demultiplexer portions, and controls the cell to be output from the demultiplexer portion. After the finish of outputting of the cell, the control portion repeats the above-mentioned operation for realigning the wavelength division multiplexed cells into a cell train by the time base.

BRIEF DESCRIPTION OF THE DRAWINGS

FIG. 2 is a diagram showing a cell structure in the embodiment;

FIG. 3A and FIG. 3B are diagrams showing data forms used in the embodiment;

FIG. 11A and FIG. 11B are illustrative representations for explaining the operation of the DMX portion shown in FIG. 9;

FIG. 12A and FIG. 12B are illustrative representations showing another embodiment of a cell structure;

FIG. 13 is an illustrative representation showing another embodiment of a cell structure;

FIG. 19 is a block diagram showing details of indicated contents by a ROM shown in FIG. 18;

FIG. 20 is an explanatory diagram showing the relationship between an input and an output of the ROM shown in FIG. 18.

FIG. 27 is a block diagram showing another embodiment of an optical switching system of the present invention.

DESCRIPTION OF THE PREFERRED EMBODIMENTS

Figure 1:
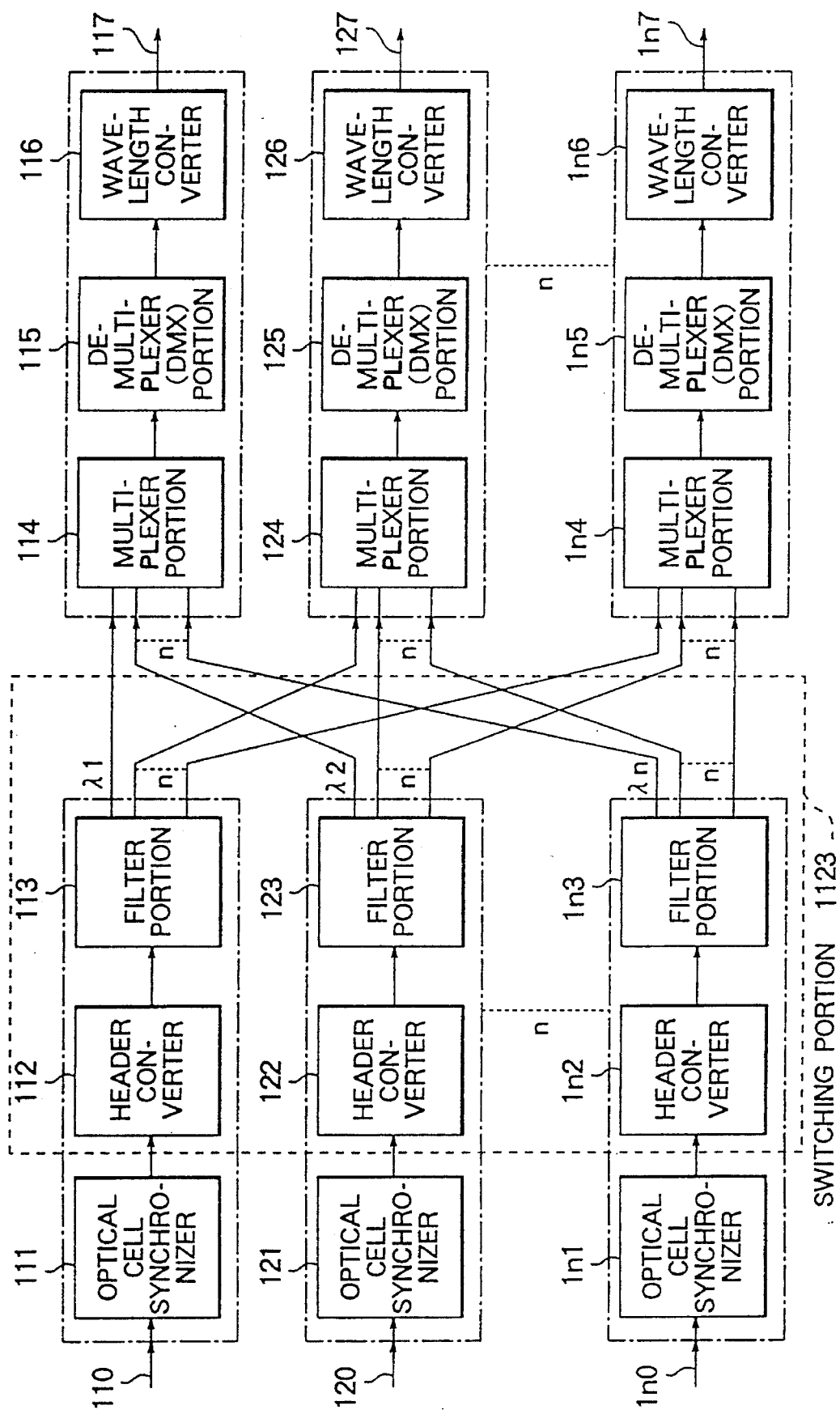
FIG. 1 is a block diagram showing a constitution of an optical switching system as an embodiment of the present invention.

An embodiment according to the present invention will be explained referring to FIG. 1. FIG. 1 shows the constitutional block diagram of an optical switching system in the present embodiment.

In FIG. 1, n incoming lines, 110 to 1n0, are optical transmission lines such as optical fibers being connected to optical cell synchronizer portions, 111 to 1n1, and from all incoming lines pieces of fixed length cell information arrive in the state of optical signals. In the optical cell synchronizer portions, 111 to 1n1, the front positions of cells from respective incoming lines are aligned and the fixed length cells (or fixed length packets) are synchronized and they are supplied to header converter portions, 112 to 1n2. In the header converter portions, 112 to 1n2, routing information contained in the header portions in the cells is taken out and the routing information together with the data portions of the cells are transmitted to the filter portions, 113 to 1n3, in the following stage. A switching portion 1123 is composed of the header converter portions and the filter portions. The switching portion 1123 converts synchronized cells to different wavelengths by input transmission lines, and performs switching based on the routing information in the cells. The filter portions, 113 to 1n3, are those for assigning the cells their respective output routes, and only the filter corresponding to an desired output route is controlled to be passed based on the routing information from the header converter portion. A filter portion is connected to n pieces of multiplexer portions, 114 to 1n4, so that n×n space sharing switches are constituted between a filter portion and multiplexer portions. In the multiplexer portions, 114 to 1n4, the cells which arrive from respective filter portions are multiplexed and the multiplexed data are transmitted to DMX portions (demultiplexing), 115 to 1n5. In the DMX portions, 115 to 1n5, respective cells are split from multiplexed data, and they are aligned in line by the time base. In the wavelength converter portions, 116 to 1n6, the cells having various wavelengths are converted to those having a single output wavelength.

Next, respective blocks will be explained in detail.

Figure 4:
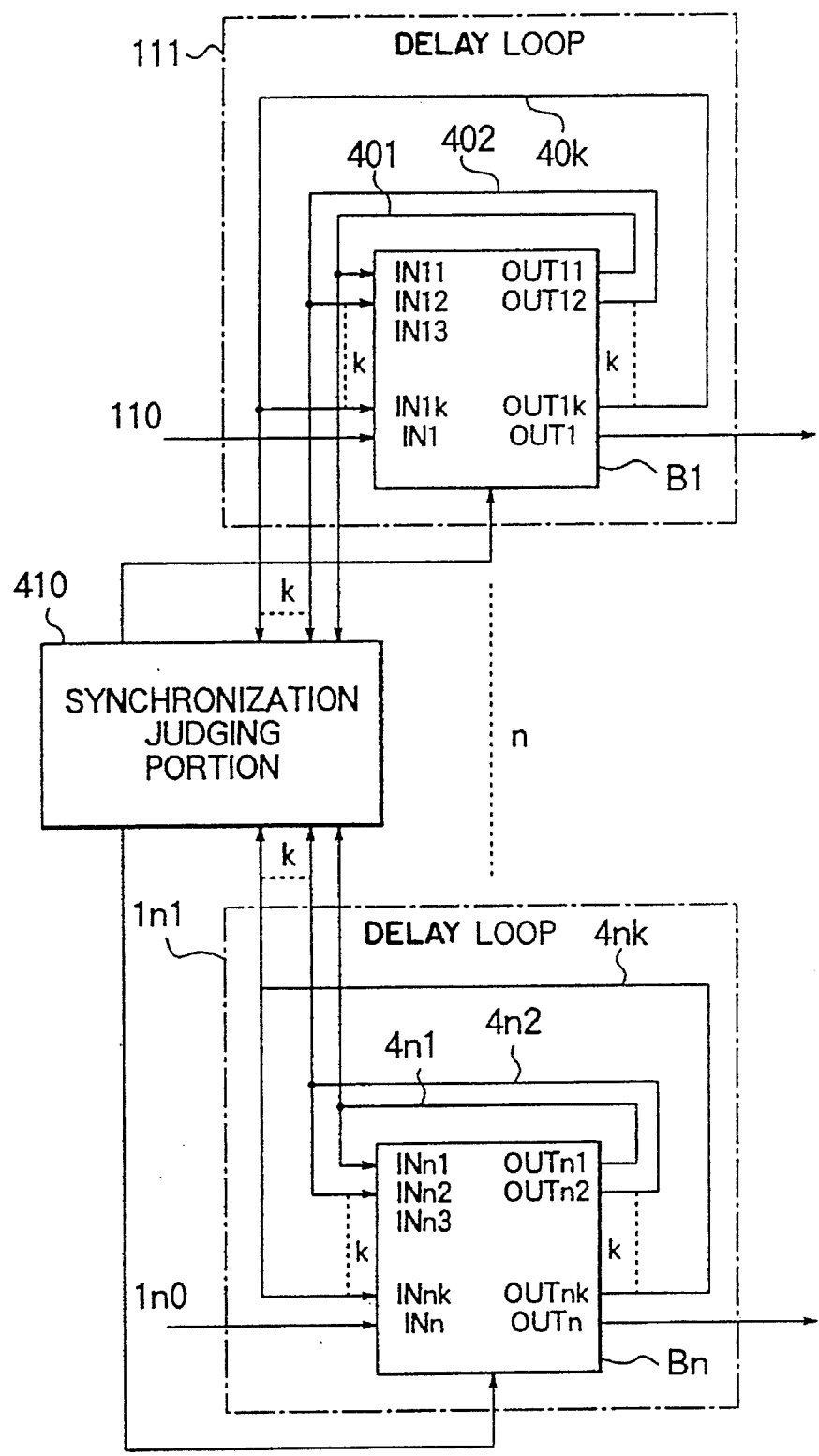
FIG. 4 is a block diagram showing a constitution of an optical cell synchronizer portion in the embodiment.

At first, the optical cell synchronizer portions, 111 to 1n1, will be explained referring to FIGS. 2, 3 and 4. FIG. 2 shows a cell constitution. FIGS. 3A and 3B show a data form in an incoming line. FIG. 4 shows a detailed functional block diagram of an optical cell synchronizer portion. In FIG. 2, a cell is constituted with fixed length data composed of a routing information portion (5 bytes for instance) and a data portion (48 bytes for instance), and signals expressing the fronts of cells of wavelength λ and the cells of wavelength λ' are inputted to the optical cell synchronizer portions, 111 to 1n1, as shown in FIGS. 3A and 3B. The signals expressing the fronts of the cells of wavelengths λ and the cells of wavelength λ' can be inputted with an incoming line being multiplexed or they can be inputted with different lines.

Respective optical cell synchronizer portions are provided corresponding to incoming lines, 110 to 1n0, and include respectively input/output portions (IN, OUT) and k pieces of delay loops, 401 to 40k as shown in FIG. 4. The lengths of all k pieces of delay loops are different from each other. The shortest delay loop has the length corresponding to the period of time for one cell of an optical signal, and the second shortest loop has a little longer lengths and so on. For example, their delay times are set to be longer by the period of time corresponding to 1 bit of the cell. The synchronization judging portion 410, to which delay loops of all optical cell synchronizer portions are connected, judges synchronization (timing).

Now, one optical cell synchronizer portion 111 will be observed: the cells and the cell front signals inputted to an input portion IN1 are distributed to output portions, OUT 11 to OUT 1k, except an output portion OUT 1. The distributed data arrive at input portions, IN 11 to IN 1k, at different times respectively passing through respective delay lines. At the same time, the distributed data arrive at the synchronization judging portion 410 through respective delay loops. Similar processes are also performed in the other optical cell synchronizer portions. In the synchronization judging portion 410, cell front signals of optical signals from respective delay lines of the optical cell synchronizer portions, 111 to 1n1, are detected, and the cells which arrive at the synchronization judging portion 410 at the same time from the respective delay lines of synchronizers, 111 to 1n1, are detected. In order that the cells which arrive at the same time are outputted synchronized delay loops are designated for respective synchronizer portions, 111 to 1n1, and they are instructed to output from outputs, OUT 1 to OUT n. It is because of the fact that when all input portions, IN11 to IN1k, and INn1 to INnk, are observed, since the arrivals of cells are shifted 1 bit by 1 bit by delay lines, there should be at least one part of cells arriving at input portions at the same time in respective optical synchronizer portions. The synchronization of cells with each other is performed by outputting the above-mentioned cells to output portions, OUT 1 to OUT n. The synchronized cells are transmitted to the header converter portions, 112 to 1n2. Besides, B1 to Bn represent buffer portions.

For example, to simplify the explanation, two units of synchronizer portions, 111 and 1n1, will be taken up as an example. The cells which arrive at input portions, IN 1 and IN 2, of respective synchronizer portions are assumed to have phase difference of 2 bits between them. The data of a cell inputted to the input portion IN1 are distributed to output portions, OUT 11 to OUT 1k, and they arrive at input portions, IN 11 to IN 1k, and the synchronization judging portion 410 through 1 bit delay lines. At this time, the cell data arrive at the input portion IN 11 as they are without delay, they arrive at the input portion IN 13 at a delay of two bits. In the similar way to the above, the data of a cell inputted to the input portion IN n are distributed to the output portions, OUT n1 to OUT nk, and the data arrive at the input portions, IN n1 to IN nk, and synchronization judging portion 410 through 1 bit delay lines. At this time, the cell data arrive at the input portion IN n1 as they are without delay, they arrive at the input portion IN n2 at a delay of 1 bit, and they arrive at the input portion IN n3 at a delay of 2 bits. They arrive at the synchronization judging portion 410 at the same time, so that the cell inputted to the input portion IN 13 and the cell inputted to the input portion IN n1 are judged to have arrived simultaneously. The synchronizer portion 111 is instructed to output a cell, which arrives at the input portion IN 13, from the output portion OUT 1, and the synchronizing portion 1n1 is instructed to output the cell, which arrives at the input portion IN n1, from the output portion OUT n. In this way, the cells in respective transmission lines are synchronized.

Figure 5:
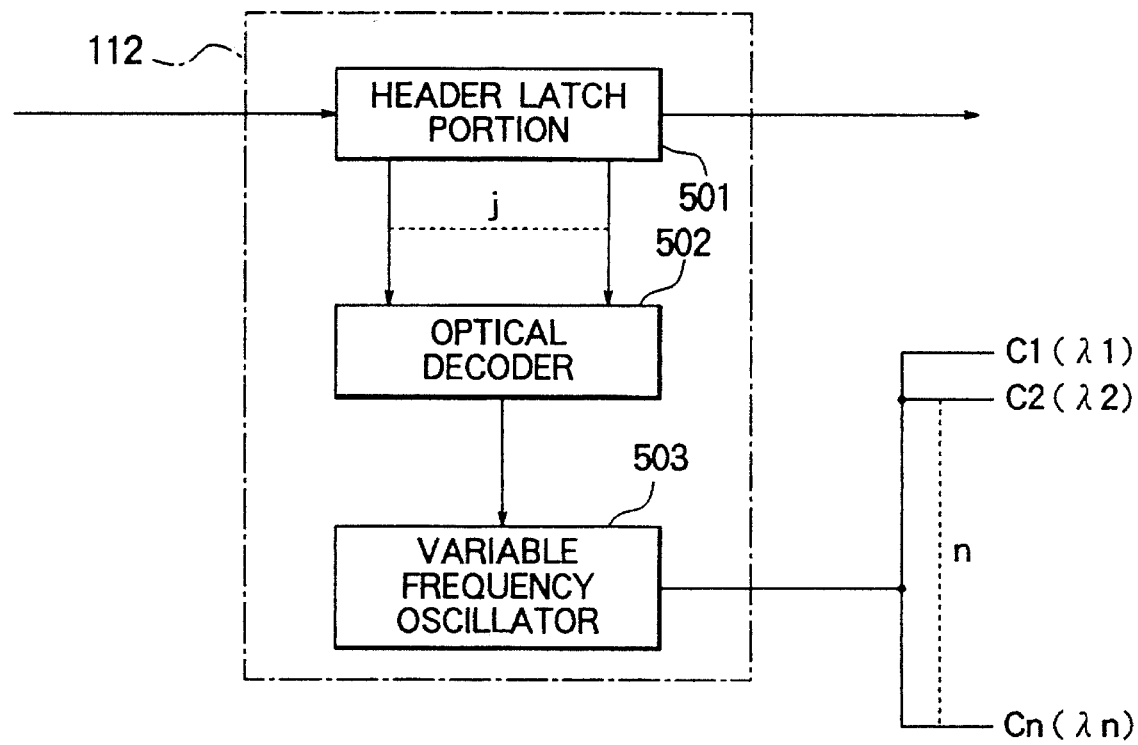
FIG. 5 is a block diagram showing a constitution of a header converter portion in the embodiment.
Figure 6:
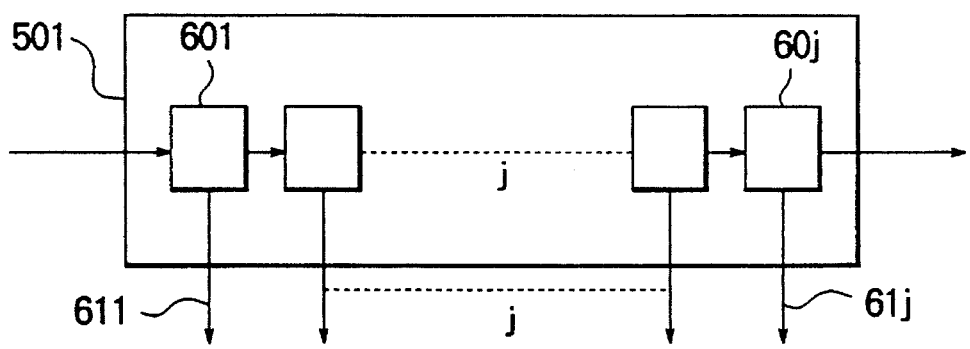
FIG. 6 is a block diagram showing a constitution of a header latch portion shown in FIG. 5.

Next, in the header converter portions, 112 to 1n2, respective pieces of routing information are read from respective cells and filter control signals are transmitted to the filter portions in the following stage. The header converter portion will be explained referring to FIG. 5 and FIG. 6. FIG. 5 shows a detailed functional block diagram of a header converter portion. FIG. 6 shows a detailed functional block diagram of a header latch portion.

The cells which arrive from respective cell synchronizer portions are inputted to the header latch portion 501. The header latch portion 501 is composed of j pieces of optical flip-flop circuits (FF), 601 to 60j, which store routing information from the header portions of the cells 1 bit by 1 bit in the optical FF's. The outputs, 611 to 61j, from respective optical FF's are inputted to the optical decoder 502 in parallel. In the optical decoder, the routing information in a cell is detected and when the predetermined address of a bit train is detected, it is converted to an optical analog signal having a degree of light intensity corresponding to an address, and it is outputted. In the optical decoder, optical analog signals having different degrees of light intensity corresponding to addresses are preset. The optical analog signals, converted as described in the above, the inputted to a variable frequency oscillator 503 which changes output oscillation frequency according to the degrees of input light intensity, and the output from the oscillator is supplied to a filter portion through a filter control line. For example, if the address is an output line 117, a wavelength $\lambda_1$ is outputted to filter control lines, C1 to Cn, as control data, respectively and if the address is an output line 127, a wavelength $\lambda_2$ is outputted to filter control lines, C1 to Cn, respectively.

Figure 7:
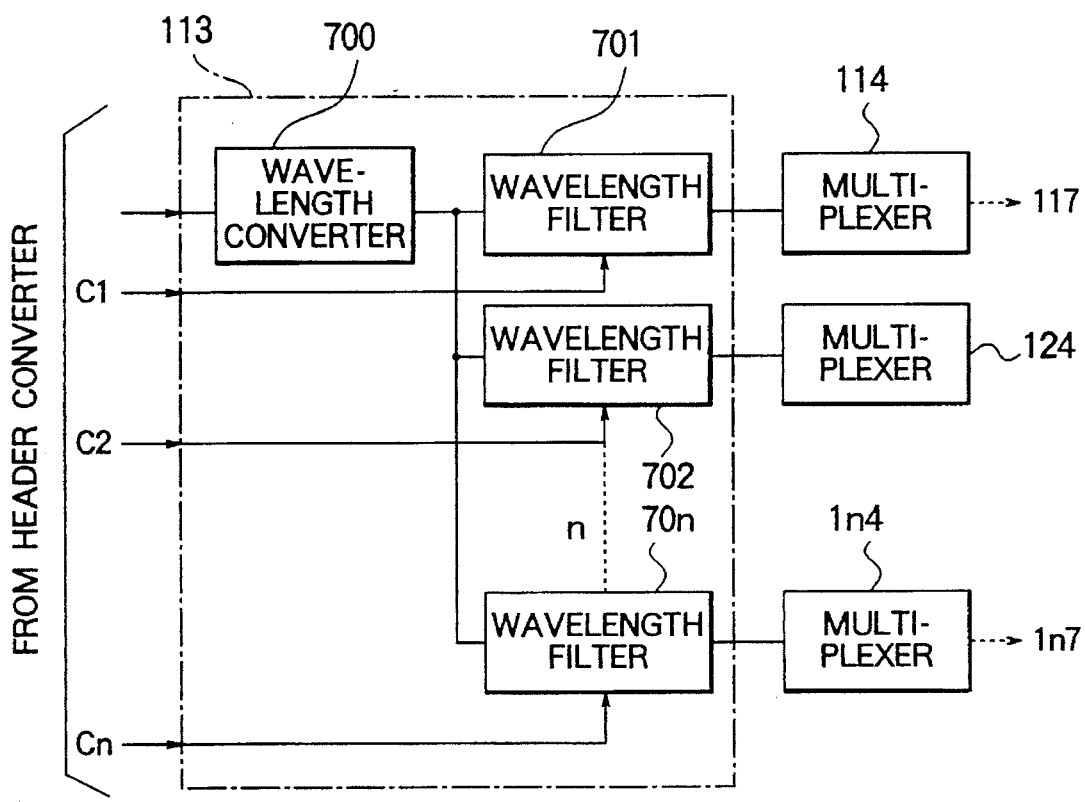
FIG. 7 is a block diagram showing a constitution of a filter portion in the embodiment.

Next, a filter portion 113 will be explained. The constitution of the filter portion 113 is shown in FIG. 7.

The filter portion 113 includes a wavelength converter 700 and wavelength filters 701 to 70n which correspond to respective output routes. The correspondence to respective output routes is means, for example, that the output of a wavelength filter 701 is supplied to the output line 117 as shown in FIG. 1, and the output of a wavelength filter 70nh in supplied to an output line 1n7. In the wavelength converter portion 700, the wavelengths of cells are preadjusted to avoid the arrival of the same wavelength cells at a multiplexer portion, when the cells from respective wavelength filters are multiplexed in a multiplexer portion in the following stage. The output of the wavelength converter portion 700 is distributed to respective wavelength filters and the switching of cells to respective addresses is performed in passing cells or stopping cells according to the information from the header converter portion through the filter control lines, C1 to Cn. The filter control lines, C1 to Cn, are for the control data outputted from the variable frequency oscillator 503 simultaneously and in parallel as shown in FIG. 5. Respective wavelength filters perform filtering of input cells by the control data of different frequencies from each other. For example, the wavelength filter 701 passes an inputted cell when the wavelength of the control data is $\lambda_1$, and when the frequency is other than that, an input cell is not allowed to pass. The wavelength filter 702 passes a cell when the wavelength of the control data is $\lambda_2$.

Figure 8:
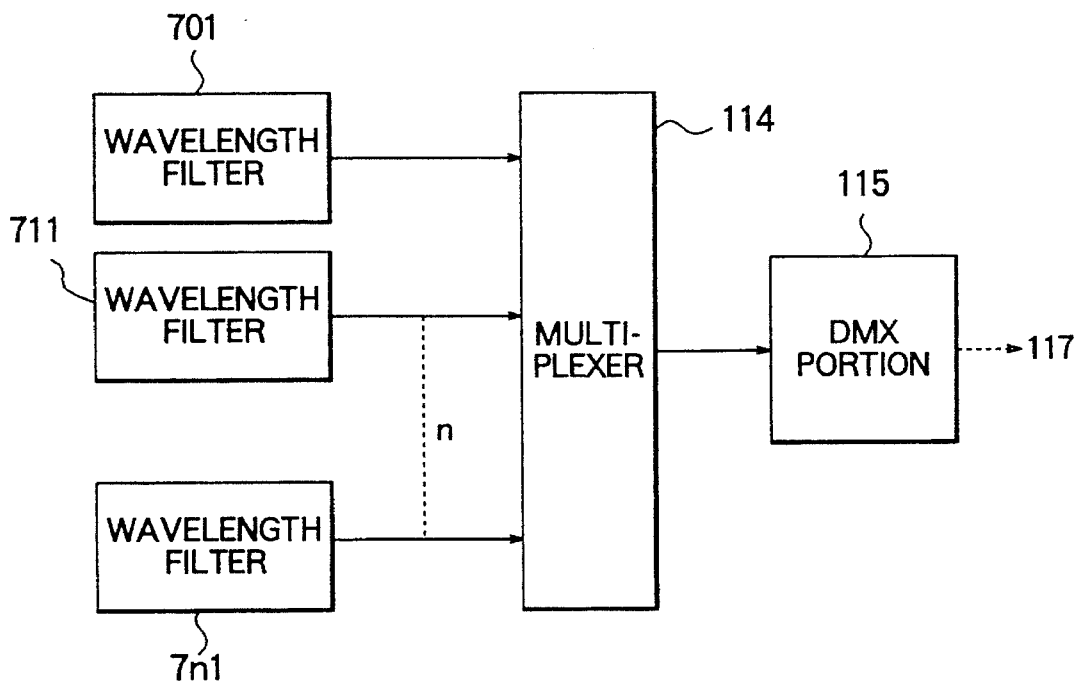
FIG. 8 is a block diagram showing a constitution of a multiplexer portion in the embodiment.

Next, the constitution of a multiplexer portion is shown in FIG. 8. FIG. 8 shows the connection diagram of a multiplexer 114 for outputting data to the outgoing line 117 shown in FIG. 1. The multiplexer portion performs wavelength division multiplexing of cells inputted from wavelength filters, 701 to 70n, in a filter portion provided in every incoming line, and transmits them to the DMX portion 115.

Figure 9:
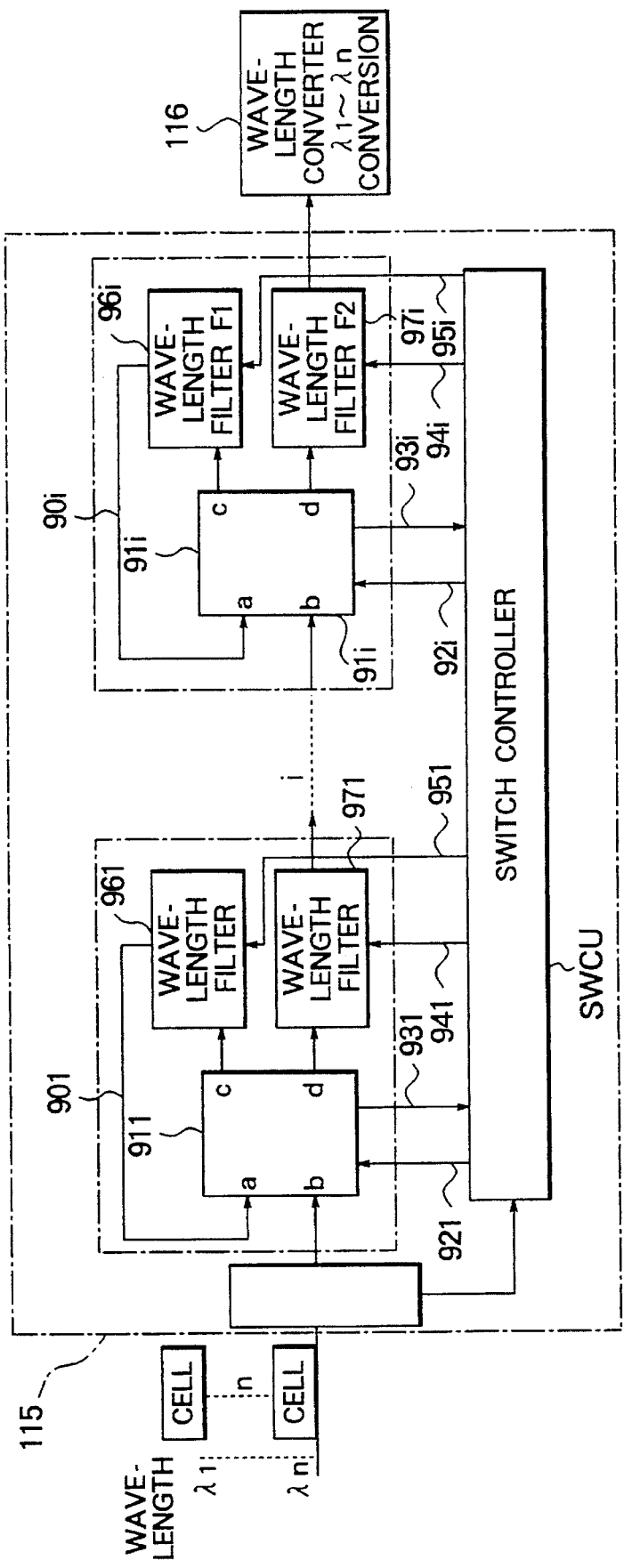
FIG. 9 is a block diagram showing a constitution of a DMX portion in the embodiment.
Figure 17:
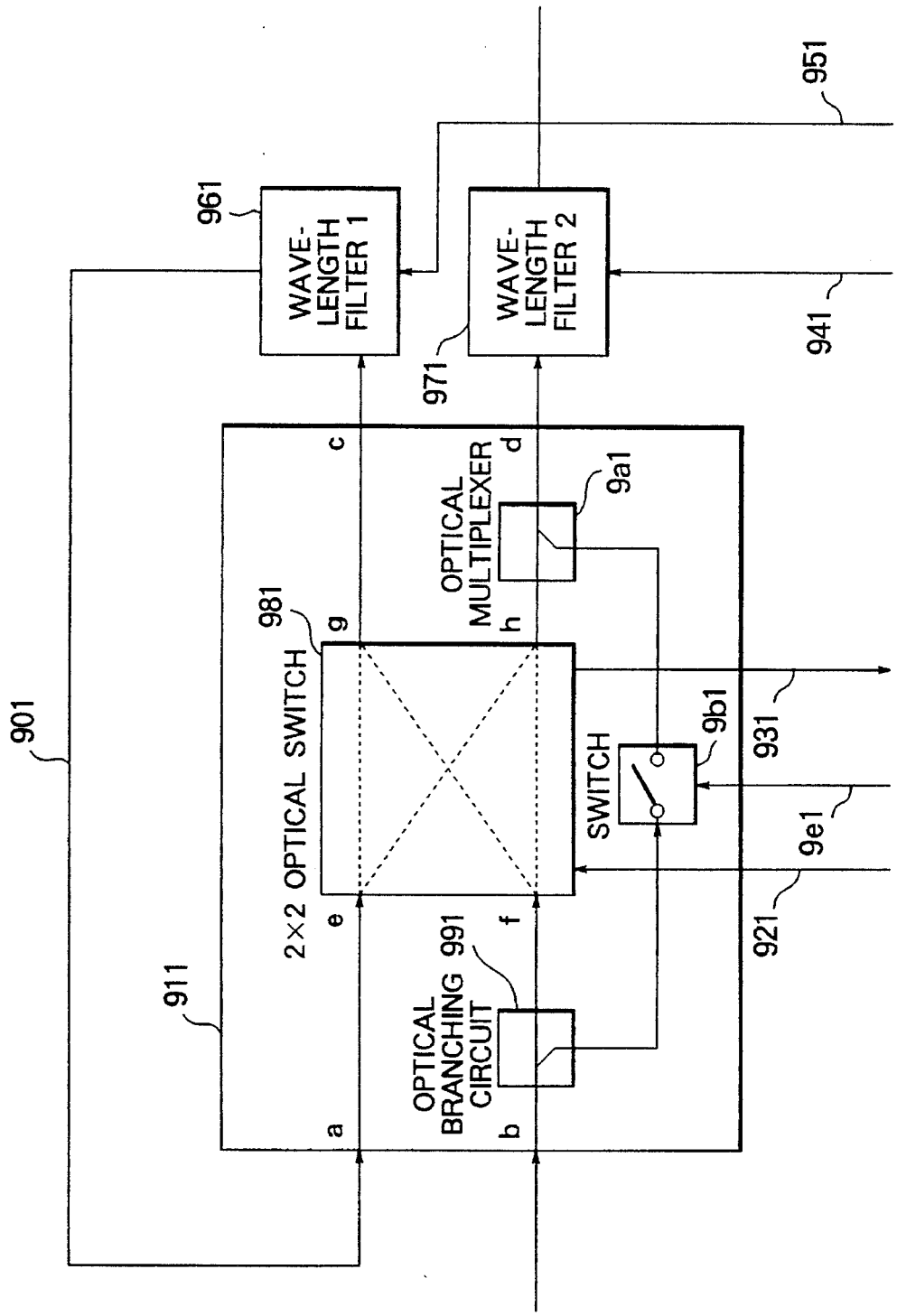
FIG. 17 is a block diagram showing a detailed constitution of a buffer shown in FIG. 9.
Figure 18:
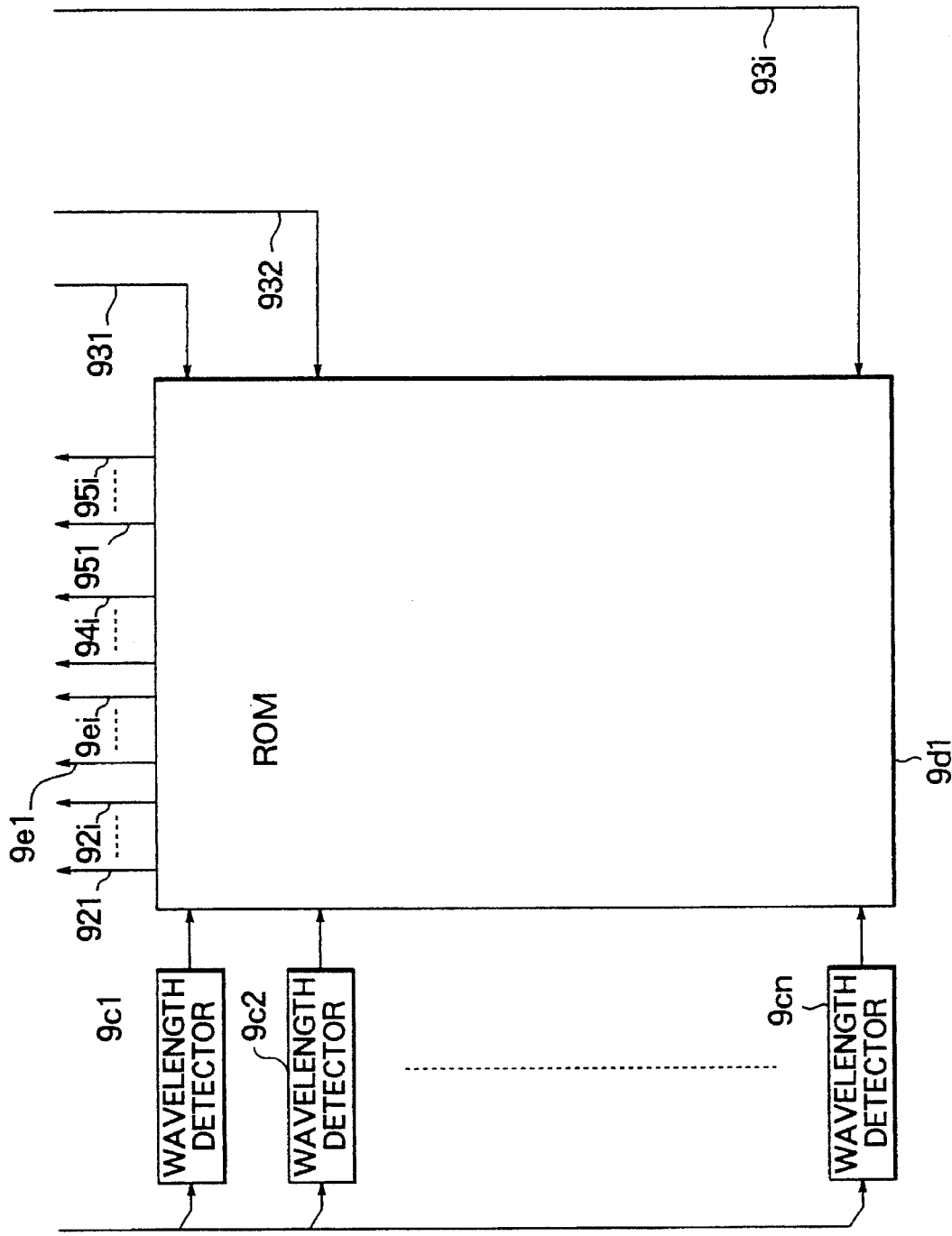
FIG. 18 is a block diagram showing a detailed constitution of a switch control portion shown in FIG. 9.

Next, the DMX portion 115 has a function to split cells from multiplexed data and to align the cells in line by the time base. In FIG. 9, the block diagram of the DMX portion 115 is shown. FIG. 17 shows the constitutional diagram of a buffer portion, and FIG. 18 shows the constitutional block diagram of a switch controller portion.

As shown in FIG. 9, the DMX portion 115 includes i pieces of buffers, 911 to 91i, and the switch controller portion. The multiplexed cells are inputted to an input "B" of a buffer 911. The cells outputted from outputs "c" of respective buffers are inputted to inputs "a" of respective buffers through respective wavelength filters, 961 to 96i. The cells outputted from outputs "d" of respective buffers are inputted to inputs "b" of the succeeding stage buffers or to the wavelength converter portion 116 in the following stage through respective wavelength filters, 971 to 97i. Respective buffers are made possible to accumulate the data for 1 cell by buffer delay loops, and the cells to be accumulated are split by the wavelength filter 961 from wavelength division multiplexed cells inputted from the input "b". The split cells are inputted from the input "a" through a delay loop 901. In this way, a cell for a period of time of one cell is accumulated. In this case, the remaining cells are split by the wavelength filter 971 to be outputted. The wavelength filters, 961 to 96i, and the wavelength filters, 971 to 97i, are variable length filters; in the case of fixed length filters, a plurality of fixed length filters can be provided corresponding to all wavelengths.

Figure 10:
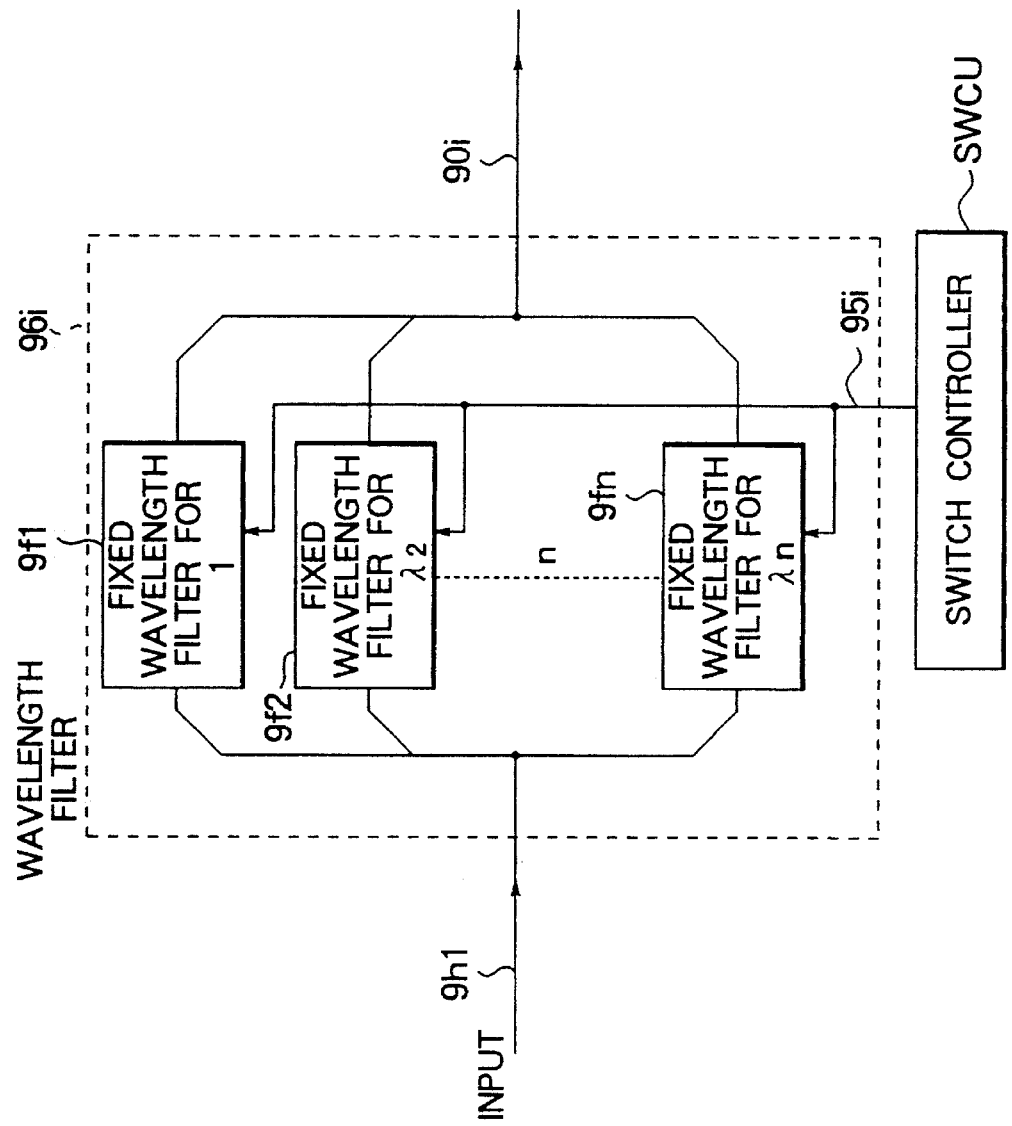
FIG. 10 is a block diagram showing a modified example of a wavelength filter shown in FIG. 9.

A case when fixed length filters are used will be described with reference to FIG. 10. The data inputted to a fixed wavelength filter 96i from an input 9h1 are distributed among n pieces of fixed wavelength filters. Respective fixed wavelength filters pass designated wavelengths only ($\lambda_1, \lambda_2, \ldots \lambda_n$) through a filter through filter control lines 95i from a switch control portion SWCU.

Further, detailed explanation of buffers will be given referring to FIG. 17 and FIG. 18. As shown in FIG. 17, a buffer portion includes an optical switch 981 of 2×2, an optical branching portion 991, a switch 9b1 and an optical multiplexer portion 9a1. The optical switch 981 is controlled by the switch controller portion through a control line 921, and it is instructed to perform either cross switching, "f" to "g" and "e" to "h", or bar switching, "f" to "h". The switch 9b1 is controlled by the switch controller portion through a control line 9e1, and when it is ON the optical multiplexer portion 91a is controlled to pass light and when it is OFF light is not passed.

The cells inputted from a terminal "b" are distributed to the optical switch 981 and switch 91b passing through the optical branching portion 991. For splitting cells, the optical switch 981 performs cross switching from "f" to "g" and the switch 9b1 is made ON and the optical multiplexer 9a1 is controlled to pass light. The cells inputted from the input "f" of the optical switch 981 are outputted from the output "g" and they are inputted to the wavelength filter 961. In the wavelength filter 961, an instruction is given by the switch controller portion SWCU to pass only the cells of one wavelength. On the other hand, the cells which are passed through the switch 9b1 are inputted to the wavelength filter 971 through the optical multiplexer portion 9a1. The wavelength filter 971 is instructed from the switch controller portion to pass the cells of wavelengths other than the cells of the wavelength which is passed through the wavelength filter 961. In this way, the cells which are wavelength division multiplexed are split into respective cells and stored in one buffer. When they are outputted, the switch controller portion SWCU instructs a buffer "α" ($1 \leq \alpha \leq i$) to output and the buffer outputs cells to the succeeding stage buffer (α+1). When cells are outputted, the optical switch 981 is controlled to be in a cross state and connected from "f" to "g" and from "e" to "h", and the cells stored in a buffer are outputted from the output "d" to the wavelength filter 971 through "e" to "h". The output from the buffer in the preceding stage is accumulated in delay lines through "f" to "g". The split cells are outputted in order from the buffer 91i. The switch controller portion SWCU includes a ROM and a wavelength detector as shown in FIG. 18. There are n pieces of wavelength detectors to be used for, $\lambda_1$ to $\lambda_n$, which detect multiplexed wavelengths from multiplexed cells. The information of a display of accumulating cells, which shows the using state of buffers, is inputted to the ROM from respective buffers through the control lines, 931 to 93i. The switch controller portion registers control information beforehand in a memory means such as a ROM, and controls the input wavelength and the using state of buffers in assigning addresses to them.

The actual operation in the DMX portion 115 will be explained referring to FIG. 11A and FIG. 11B. Illustrative representations for explaining the details of operation in the DMX portion are shown in FIG. 11A and FIG. 11B. The examples of control information in the ROM are shown in FIG. 19 and FIG. 20.

In FIGS. 11A and 11B, for simplifying explanation, a case where input wavelengths are $\lambda_1$, $\lambda_m$ and $\lambda_n$ will be adopted as an example. As shown in FIG. 11A, in the period of time, from T0 to T5, when the data having input wavelengths of $\lambda_1$, $\lambda_m$ and $\lambda_n$ are inputted to the DMX portion, at time T1, a cell (X-0) is accumulated in a buffer i, and at time T2, a cell (X-0) is outputted and a cell (X-1) is accumulated in the buffer i. As in the case of time T3, when 3 cells arrive simultaneously, the switch controller portion detects that the 3 wavelengths are multiplexed, and since a buffer in use is only the buffer i in the last stage, instruction is given as shown in FIG. 19 and FIG. 20. In this way, a cell (X-2) is accumulated in the buffer i, a cell (Y-1) is accumulated in a buffer (i-1) and a cell (Z-1) is accumulated in a buffer i-2. In a similar way to the above, arriving cells are accumulated in buffers cell by cell in order and outputted from the buffer i.

The cells, processed as described in the above, are converted to have a single wavelength for output in the wavelength converter 216 and outputted to the outgoing line 117.

According to the present embodiment, cells are synchronized in optical cell synchronizer portions 111 to 1n1, routing information is analyzed in the header converter portions, 112 to 1n2, and switching can be performed by the instruction of filter portions, 113 to 1n3, indicating the output routes for respective cells. In the multiplexer portions, 114 to 1n4, cells which arrive from respective filter portions are wavelength division multiplexed, in the DMX portions, 115 to 1n5, cells are split into respective cells from multiplexed data and they are aligned in line by the time base, and in the wavelength converter portions, 116 to 1n6, cells of various wavelengths can be converted to a single output wavelength. As described in the above, fixed length cells composed of header portions and information portions are synchronized and a plurality of pieces of communication information are switched in the state of optical signals based on the routing information contained in the header portions between a plurality of incoming lines and a plurality of outgoing lines, and a system in which cells are wavelength division multiplexed can be constituted.

Next, other embodiments of respective blocks are shown. FIGS. 12A, 12B and FIG. 13 are other examples of illustrative representations showing data forms of an incoming line. In FIGS. 12A and 12B, 2 kinds of wavelengths $\lambda_1$ and $\lambda_2$ are used alternately as cell front signals for recognizing the partitions between cells. FIG. 13 shows another data form in which cell data serve also as front signals and the changing points of wavelength are detected using 2 kinds of wavelengths, $\lambda_1$ and $\lambda_2$, alternately, thereby to recognize the partitions between cells.

Figure 14:
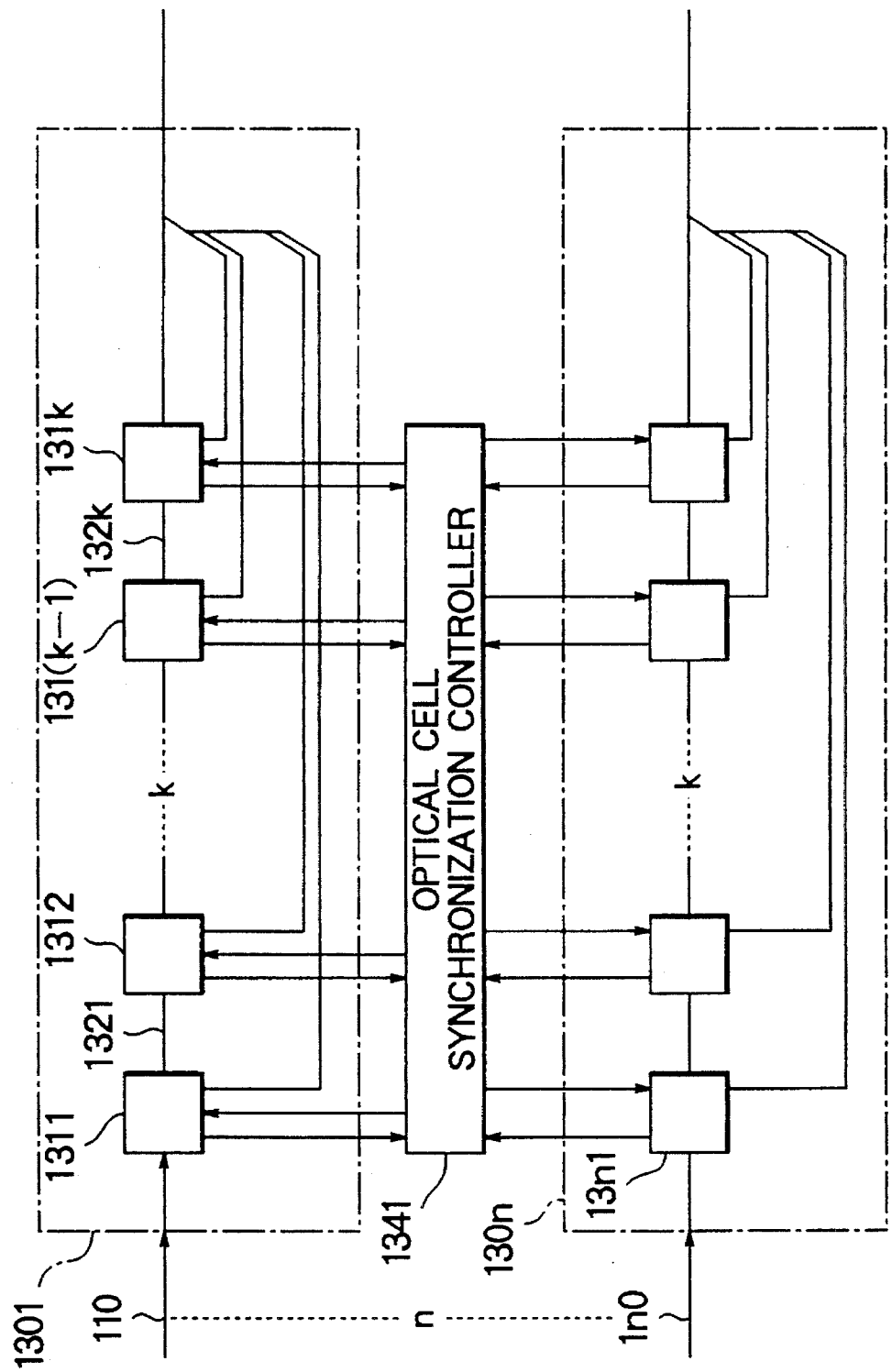
FIG. 14 is a block diagram showing another embodiment of an optical cell synchronizer portion.

FIG. 14 shows another block diagram of optical cell synchronizer portions 111 to 1n1. Respective optical cell synchronizer portions are provided corresponding to incoming lines, 110 to 1n0, and include cell front detector portions, 1311 to 131k for detecting cell fronts, and delay lines for connecting among cell front detector portions. The length of a delay line is, for example, set to correspond to 1 bit of a cell. The signals from respective incoming lines are inputted to the cell front detector portions, 1311 to 13n1, and when a cell front is detected in the cell front detector portion, a detection signal is transmitted to an optical cell synchronization controller portion, and if any instruction is not obtained from the optical cell synchronization controller portion, a cell is outputted toward the succeeding cell front detector portion. Then, the cell is inputted to the succeeding cell front detector portion through a delay line, and the same processes as those described in the above are performed. In the optical cell synchronization controller portion, cell detection signals from respective optical cell synchronizer portions are watched, and when cell detection signals from all optical cell synchronizer portions are detected simultaneously, the cell front detector portions of respective optical cell synchronizers portions are instructed to output to the header converter portion 112 in the following stage. In this way, the cells of which cell fronts are detected simultaneously can be taken out, and the synchronization of cells can be performed.

Figure 15:
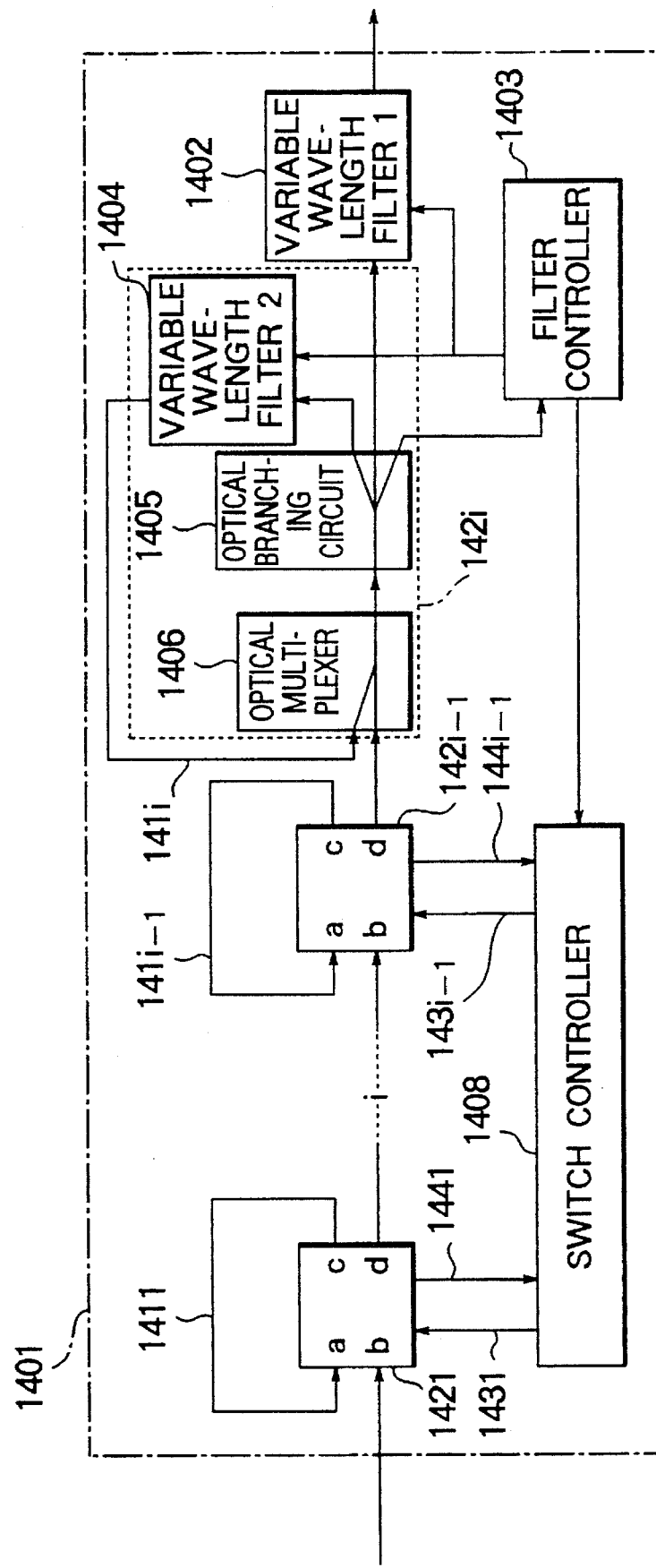
FIG. 15 is a block diagram showing another embodiment of a DMX portion.

FIG. 15 shows another block diagram of the DMX portion. The DMX portion includes: i pieces of buffers, 1411 to 141i, for accumulating the cells from multiplexer portions, a variable wavelength filter 1402, a variable wavelength filter 1404, an optical multiplexer portion 1406, an optical branching circuit 1405, a switch controller portion 1408 and a filter controller portion 1403. Respective buffers are capable of accumulating a plurality of cells of a plurality of wavelengths. In other words, a plurality of cells wavelength division multiplexed by multiplexer portions are accumulated in buffers through buffer delay loops in the forms just as they are. In the buffers, 1411 to (141i-1), switching of outputs, output c or output d, is performed by the instruction from the switch controller portion 1408. The last stage buffer (output buffer) 141i includes a variable wavelength filters 1402 and 1404, an optical multiplexer 1406 and an optical branching circuit 1405. Cells outputted from the optical branching circuit 1405 are distributed to the variable wavelength filter 1402, the variable wavelength filter 1404, and the filter controller portion 1403. The filter controller portion 1403 analyzes multiplexed wavelengths and investigates what wavelengths are multiplexed, and instructs a variable wavelength filter what signal wavelength is to be passed. The filter controller portion 1403 instructs the switch controller portion 1408 to output the next cell when it judges that there is no cell to output. The variable wavelength filter 1402 outputs only cells of one wavelength instructed by the filter controller portion 1403, and in the variable wavelength filter 1404, the cells of wavelength other than the above-mentioned wavelength are passed and accumulated in a buffer 141i. The wavelength division multiplexed cells are passed through the buffer 141i and the optical multiplexer portion 1406 and arrive again at the optical branching circuit 1405. After the repetition of the operation of number of times equal to the number of wavelengths being multiplexed, the switch controller portion 1408 is informed that there is no cell to be outputted. In order to exchange the contents of buffers, the switch controller portion 1408 instructs every buffer α ($1 \leq \alpha \leq (i-1)$) to output from an output d and input to the succeeding buffer (α+1).

Figure 16A:
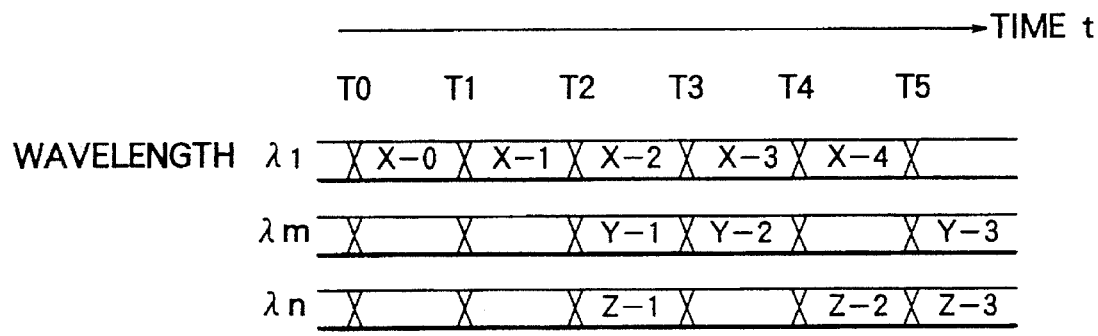
FIG. 16A and FIG. 16B are illustrative representations for explaining the operation of the DMX portion shown in FIG. 15.

The operation of the DMX portion will be explained using FIG. 16A and FIG. 16B. For simplifying the explanation, a case where there are 3 inputs of wavelengths, $\lambda_1$, $\lambda_m$ and $\lambda_n$ will be adopted as an example. As shown in FIG. 16A, when the data of input wavelengths, $\lambda_1$, $\lambda_m$ and $\lambda_n$ are inputted to the DMX portion in the period of time, from T0 to T5, at the time of T1 a cell (X-0) is accumulated in a buffer i, at T2 a cell (X-0) is outputted and a cell (X-1) is accumulated in a buffer i. As in the case of T3, when 3 cells arrive at the DMX portion simultaneously, they are wavelength division multiplexed and accumulated in the same buffer. At T4, a cell (X-2) out of the wavelength division multiplexed cells is outputted from the variable wavelength filter 1402, and a cell (Y-1) and a cell (ZA-1) of other wavelengths than the above are passed according to the instruction from the variable wavelength filter 1404. In the buffer, the cells, (X-2), (Y-1) and (Z-1) are left being accumulated. At T6, when the cell (Z-1) is outputted, a cell accumulated in the buffer (i-1) is moved to the buffer i.

According to the present embodiment, it is possible to perform switching of the communication information, wavelength division multiplexed cells in the form of optical signals, between a plurality of incoming lines and a plurality of outgoing lines using fixed length cells, each of them being composed of a header portion and a information portion, based on the routing information contained in the header portions. As described in the above, it is made possible to constitute an economical system of a speech path composed of optical parts using different wavelengths.

Figure 21:
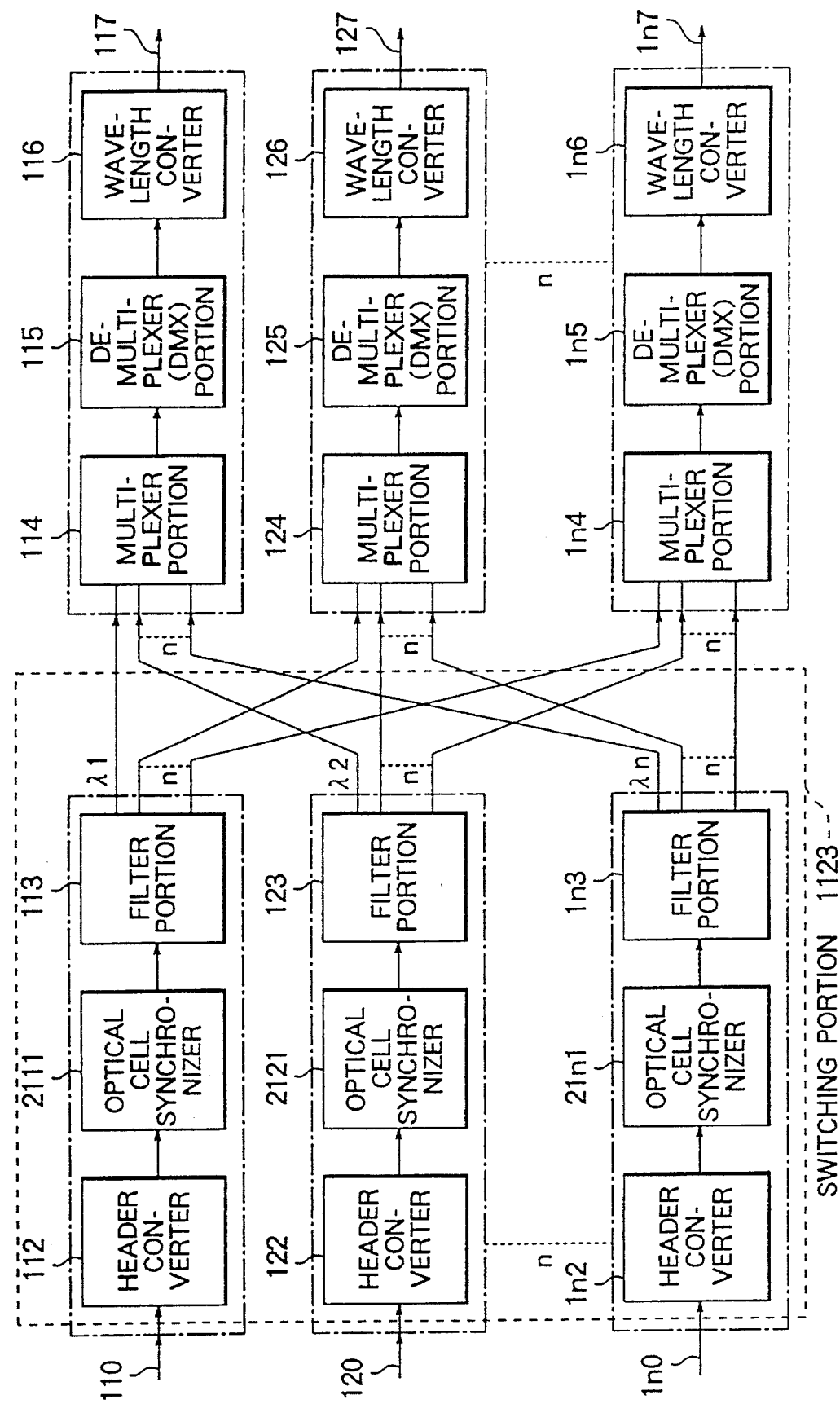
FIG. 21 is a block diagram showing another embodiment of an optical switching system of the present invention.
Figure 22:
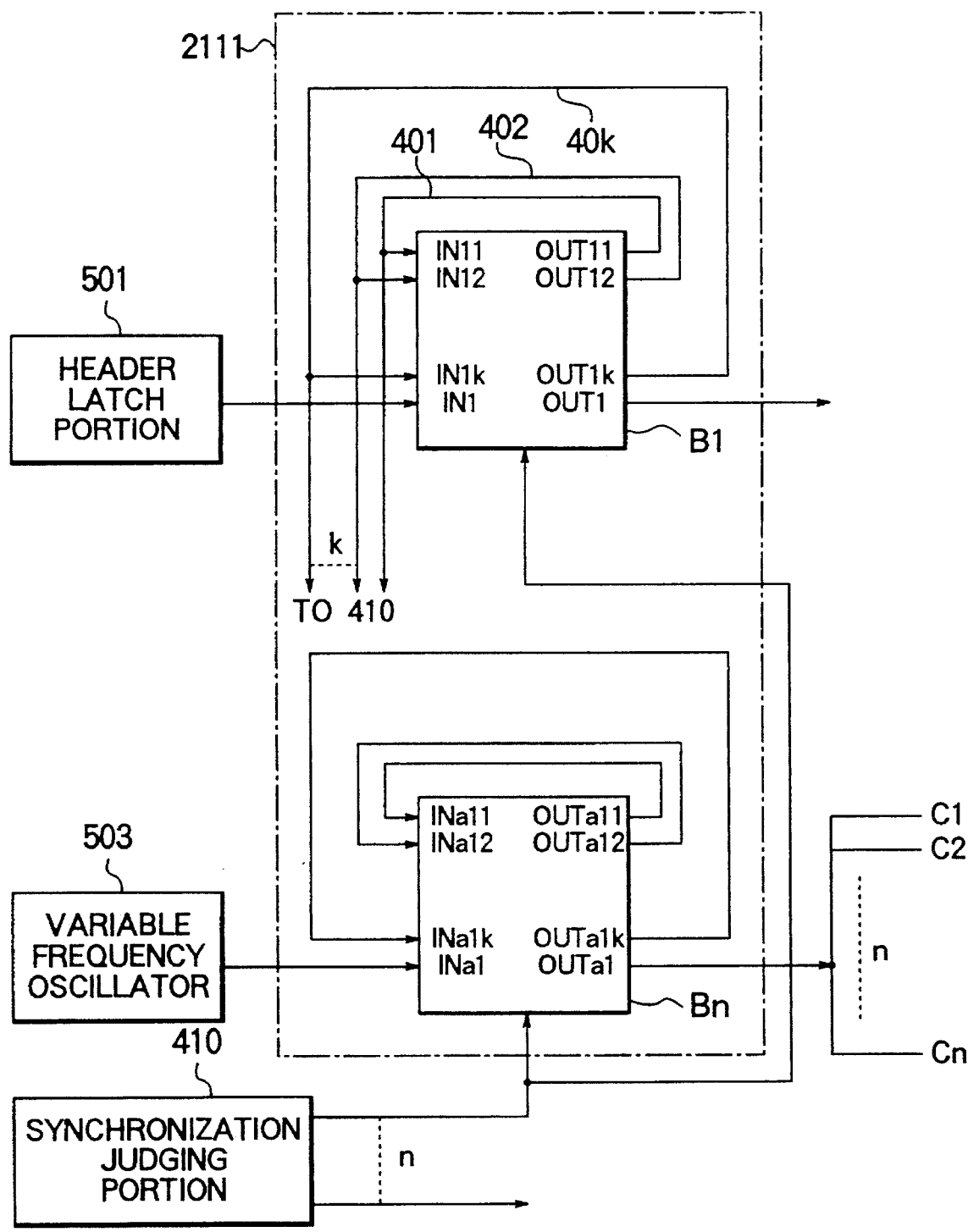
FIG. 22 is a block diagram for explaining the operation of an optical cell synchronizer portion in the embodiment shown in FIG. 21.

FIG. 21 shows another constitution of an optical switching system in the present embodiment. It is the feature of the present constitution that optical cell synchronizer portions are disposed in the succeeding stage of header converter portions. In the optical cell synchronizer portions, the front portions of the cells from respective header converter portions, 112 to 1n2, and the filter control signals are adapted to each other and transmitted to the filter portions. The operation of an optical cell synchronizer portion 2111 will be described with reference to FIG. 22. The same data of the cell and the cell front signals inputted to an input portion 1n1 from a header latch portion 501 are distributed to output portions, OUT11 to OUT1k, except OUT1. The distributed data pass through respective delay loops, 401, 402, ..., 40k, and arrive at input portions, IN11 to IN1k, at different times, respectively. At the same time, the distributed data pass through respective delay loops, and arrive at a synchronization judging portion 410, respectively. At this time, the same data are distributed among output portions, OUTa11 to OUTa1k, except OUTa1 through a filter control line connected to the input portion INa1 from a variable frequency oscillator 503. The distributed data pass through respective delay loops and arrive at input portions, INa11 to INa1k, at different times, respectively. In the synchronization judging portion 410, cell front signals of optical signals from respective delay lines of respective optical cell synchronizer portions, 2111 to 21n1, are detected, thereby to detect the cells which have arrived at the synchronization judging portion 410 at the same time from respective delay lines of the optical cell synchronizer portions. Synchronized delay lines are indicated for respective optical cell synchronizer portions so as to output the cells which have arrived at the same time, and the cells are outputted to the output portions, OUT1 to OUTn, and OUTa1 to OUTan, thereby to have the cells and the filter control signals outputted from respective optical cell synchronizer portions synchronize with each other. After synchronization, the cells are transmitted to the filter portions and switched. C1 to Cn represent filter control lines.

Figure 16B:
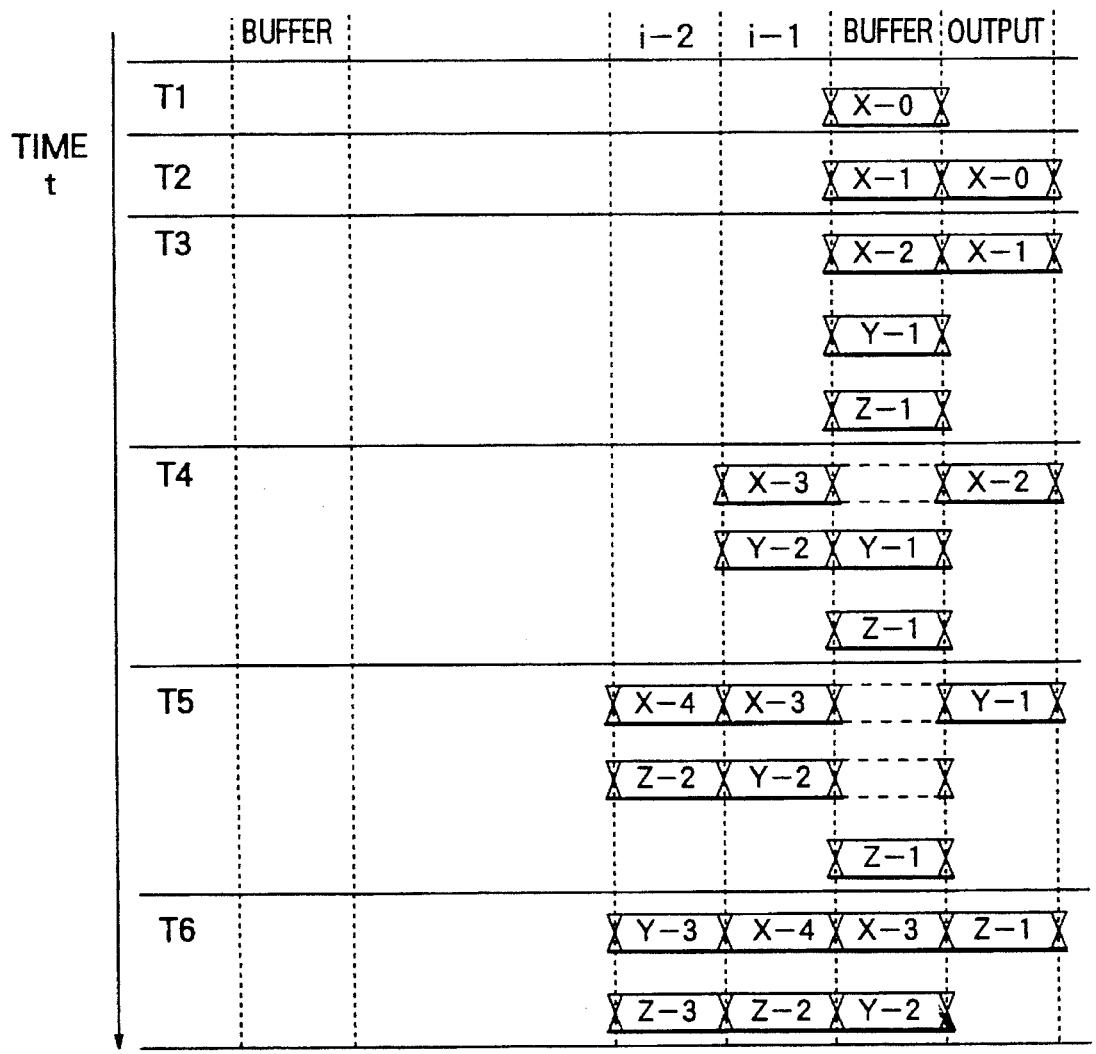
Figure 26:
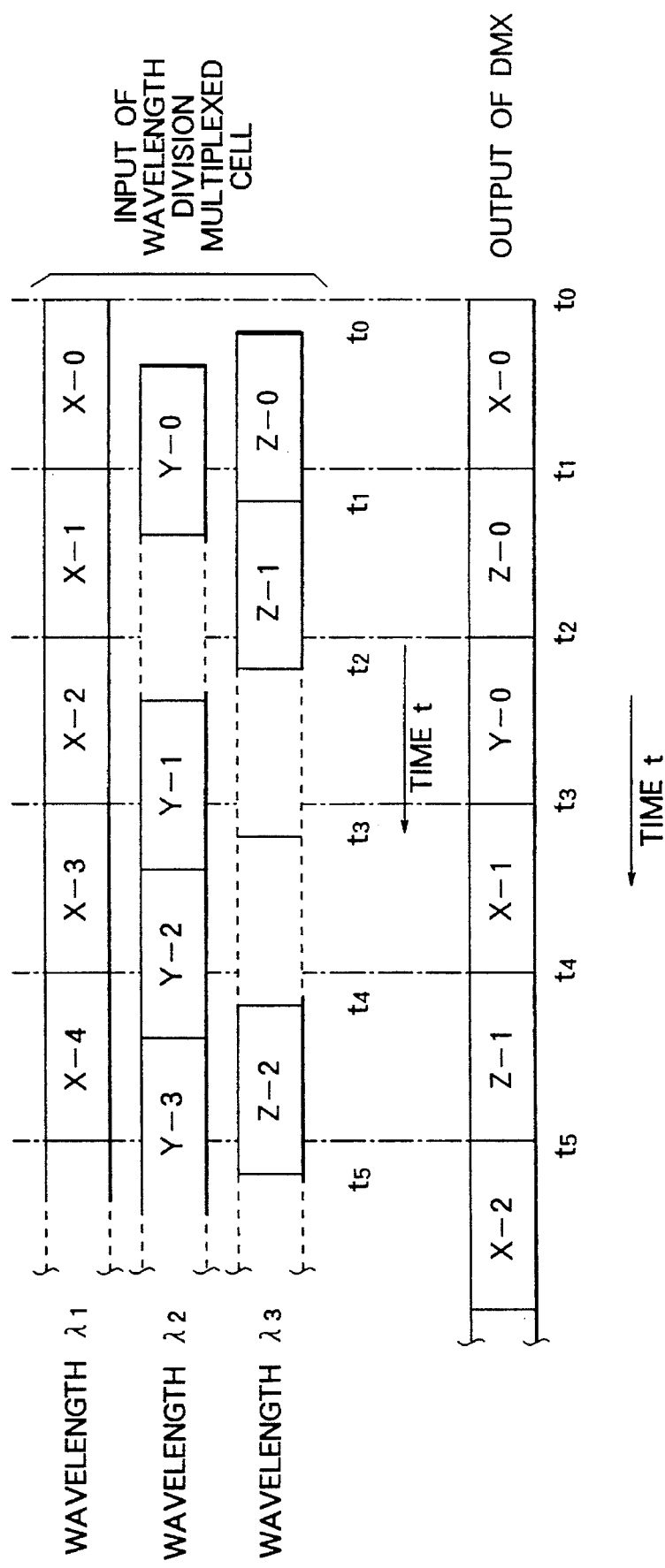
FIG. 26 is an illustrative representation for explaining the operation of the DMX portion shown in FIG. 23.

In the embodiment in FIG. 1 described in the above, the fronts of respective cells are uniform as shown in FIG. 16A and FIG. 16B in the outputs of the optical cell synchronizer portions, 111 to 1n1. According to another embodiment shown in FIG. 23 which is described hereinafter, however, the fronts of the wavelength division multiplexed cells are not uniform as shown in FIG. 26.

In the embodiment shown in FIG. 23, those that are the same as or equivalent to the members described with reference to FIG. 1 and FIG. 21 are affixed with the same reference numerals, and detailed description thereof is omitted. Therefore, description of the cell structure described with reference to FIG. 2, the header converter portion described with reference to FIGS. 5 and 6 and the filter portion described with reference to FIG. 7 is omitted here.

Another embodiment of the present invention will be described hereinafter with reference to FIG. 23. FIG. 23 is a constitutional block diagram of an optical switching system in the present embodiment.

Figure 23:
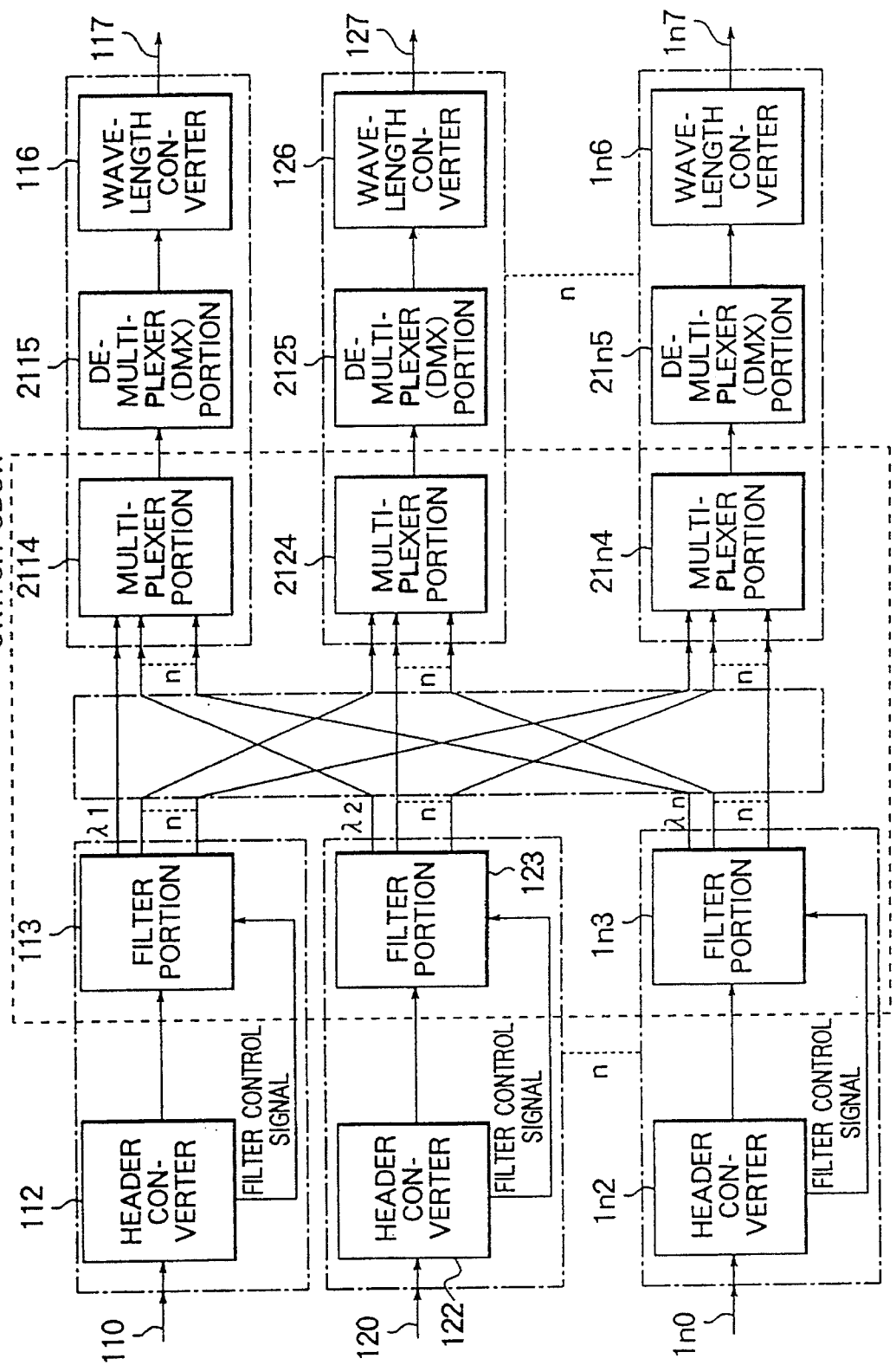
FIG. 23 is a block diagram showing another embodiment of an optical switching system of the present invention.

In FIG. 23, n pieces of incoming lines, 110 to 1n0, are composed of optical transmission lines such as optical fibers, and connected to header converter portions, 112 to 1n1, respectively, and fixed length cell information (information of cell data portions) from all the incoming lines arrives in the state of optical signals. In the header converter portions, 112 to 1n2, routing information is taken out of header portions of the cells, and the routing information is transmitted to filter portions, 113 to 1n3, in the succeeding stage together with the cells.

The filter portions, 113 to 1n3, are those for instructing output routes of respective cells and perform processes of passing through only the filters corresponding to the routes which are desired to output the cells therethrough based on routing information from header converter portions. An n×n space sharing switch is constituted between the filter portions and the multiplexers for making connections from one filter portion to n pieces of multiplexers, 2114 to 21n4.

In the multiplexers, 2114 to 21n4, the cells arriving from respective filter portions are multiplexed, and the multiplexed data are transmitted to DMX (Demultiplexing) portions, 2115 to 21n5. Here, since cells are not synchronized among respective filter portions, the front positions of the cells arriving at the multiplexers are not uniform.

In the DMX portions, 2115 to 21n5, respective cells are split from the multiplexed data, aligned in a line by the time base in order of arrival and transmitted to the wavelength converters.

In the wavelength converters, 116 to 1n6, the cells having various wavelengths are converted into a single output wavelength.

FIG. 26 is an illustrative illustration for explaining the operation of the DMX portion. Three lines of ranges of the cells shown in the upper row show wavelength division multiplexed input data inputted from the multiplexer 2114, and the range of the cells of different types in the lower row shows the output of the DMX portion 2115. Here, three wavelengths, $\lambda_1$, $\lambda_2$ and $\lambda 3$, are shown as the number of multiplexed wavelengths for the sake of simplifying the explanation.

In the DMX portion, wavelength division multiplexed cells are outputted in order as arrived earlier and aligned in a line by the time base. Now, when the front of a cell X-0 is inputted at time t0, the cell X-0 is started to be outputted since there is no other cell being inputted. It is realized that cells, Y-0 and Z-0, are being inputted into the DMX portion when the cell X-0 is stopped to be inputted and the time t1 is reached. Since the cell Z-0 is inputted earlier among these two cells, the output of the cell is started, and when the output of the cell Z-0 is ended and the time t2 is reached, the output of the cell Y-0 is started. Processing is performed in a similar manner thereafter, thereby to realign the cells in a line by the time base.

Figure 24:
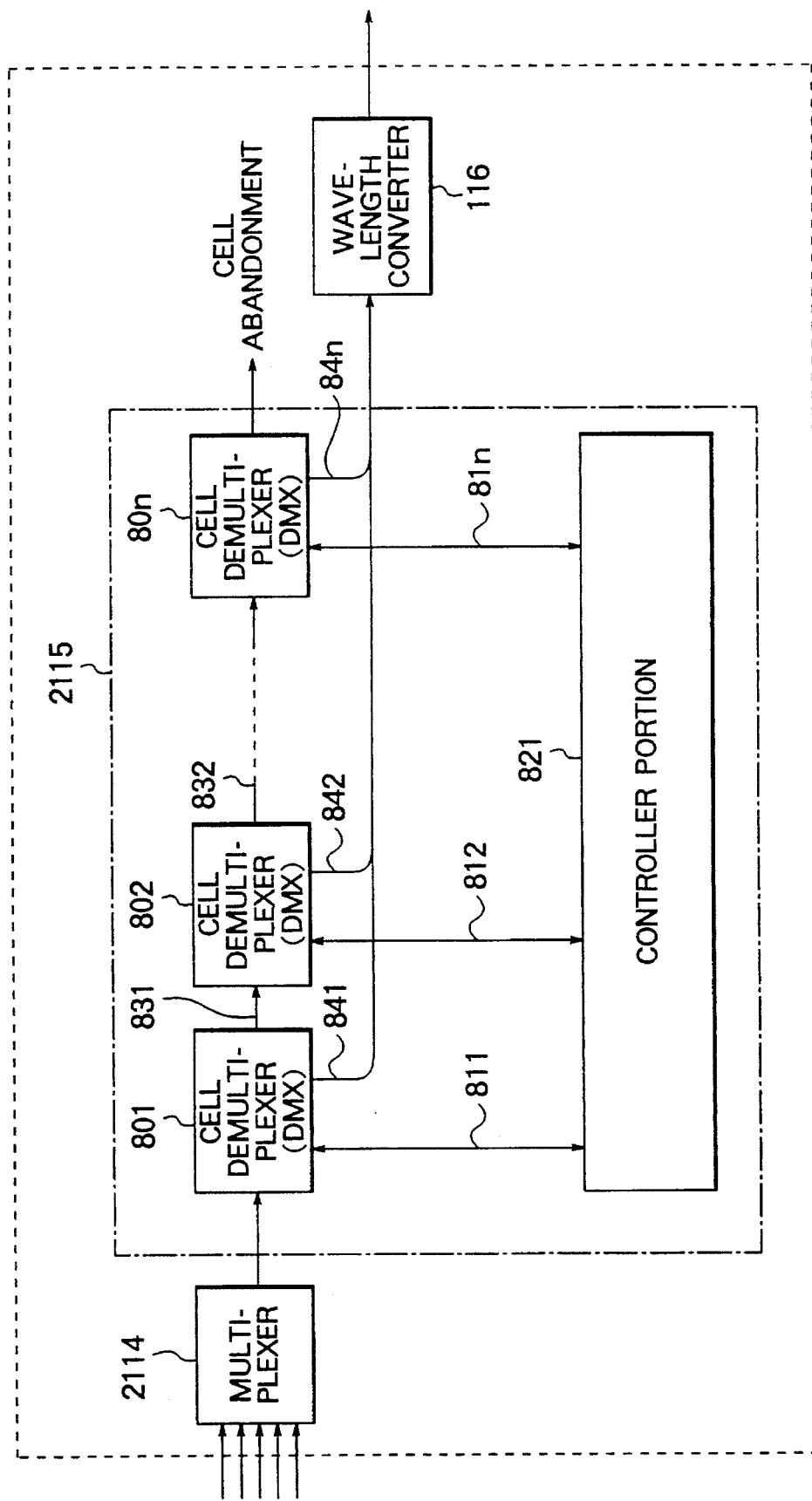
FIG. 24 is a block diagram showing a detailed constitution of a DMX portion shown in FIG. 23.
Figure 25:
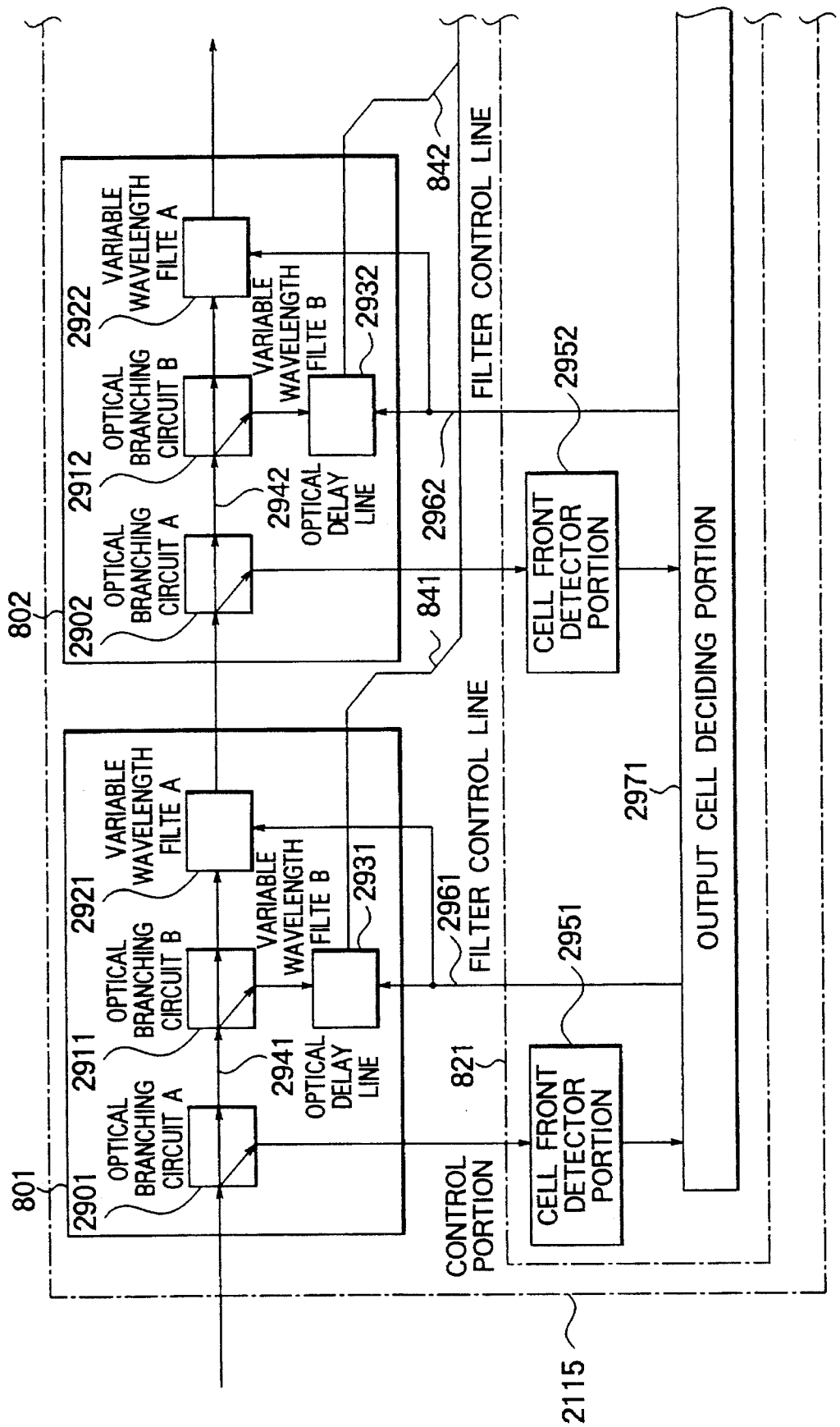
FIG. 25 is a block diagram showing a detailed constitution of a cell demultiplexer portion in the DMX portion shown in FIG. 24.

The detailed constitution of the DMX portion will be described using FIG. 24 which is a block diagram showing the constitution of the DMX portion 2115 and FIG. 25 which is a block diagram showing constitutions of a cell demultiplexer portion 801 and a control portion 821 provided in the DMX portion.

The DMX portion 2115 includes: a plurality of cell demultiplexer portions, 801 to 80n, connected in a cascade form, and control lines, 811 to 81n, connecting between the control portion 821 and these cell demultiplexer portions. When the wavelength division multiplexed data from the multiplexer 2114 are received by the cell demultiplexer portion 801, cell front signals are transmitted to the control portion 821 through control lines, 811 to 81n. In the control portion 821, the cell to be outputted is determined by watching the front signal of the cell, and the wavelength of the cell to be outputted is informed of the cell demultiplexer portions, 801 to 80n, where the determined cell exists. In the cell demultiplexer portions, 801 to 80n, the cell having the wavelength informed from the control portion 821 is split from the data and outputted to cell output lines, 841 to 84n. At the same time, the data except the split and outputted cells are outputted to a cell demultiplexer portion at the succeeding stage.

Respective cell demultiplexer portions are connected to a cell demultiplexer portion at the succeeding stage by means of delay lines, 831 to 83 (n1), and data are accumulated in these delay lines.

When output of the cell split by the cell demultiplexer portion is terminated, the control portion 821 determines the cell to be outputted in the next place and gives output instruction to the cell demultiplexer portion where that cell exists. The output cell is determined so that a cell existing in a cell demultiplexer portion near to a cell demultiplexer portion 80n located at the latest stage is outputted first. Namely, a cell which has arrived at the DMX portion 2115 earliest is outputted first to the DMX portion 2115.

Those cells that are not outputted from the cell demultiplexer portion 80n are abandoned here. Namely, in FIG. 26, when the cell Y-1 is outputted completely from the cell demultiplexer portion 80n at the latest stage, the X-3 following to the cell Y-1 is not left behind in a perfect state in the cell demultiplexer portion 80n and is abandoned, thus outputting a cell Y-1 following to the cell Y-0.

Detailed constitution and operation of the cell demultiplexer portions, 801 to 80n, and the control portion 821 will be described with reference to FIG. 25.

The cell demultiplexer portion 801 is composed of an optical branching portion A 2901, an optical branching portion B 2911, a variable wavelength filter B 2931 connected to the optical branching portion B and an optical delay line 2941 connecting the optical branching portion A and the optical branching portion B each other.

Further, the control portion 821 is composed of cell front detectors, 2951 to 295n, and an output cell determining portion 2971.

As to the wavelength division multiplexed data inputted to the cell demultiplexer portions, 801 to 80n, the same data are distributed to the cell front detector 2951 and the optical branching portion B 2911 in the optical branching portion A 2901. In the cell front detector in the control portion 821 detects the cell front signal in regard to all of the wavelength division multiplexed cells. At this time, since no synchronization has been obtained among respective wavelength division multiplexed cells, the cell front signals of respective cells arrive at various times. So, the control portion controls so as to designate the cell demultiplexer portion so that the cells are outputted in order from the cell which has arrived at the DMX portion earliest of the cell head signals arriving from all of the cell demultiplexer portions, i.e., a cell as closest as possible to the cell demultiplexer portion 80n.

Further, the other data distributed in the optical branching portion A 2901 are transmitted to the optical branching portion B 2911 through the optical delay line 2941. The length of the optical delay line is determined depending on the period of time required until the control portion 821 determines the output cell from the cell front signal distributed by the optical branching portion A. The data inputted to the optical branching portion B are distributed again here, and outputted toward the variable wavelength filter A 2921 and the variable wavelength filter B 2931, respectively.

The control portion 821 instructs the wavelengths of the cells to be passed by respective variable wavelength filters through filter control lines, 2961 to 296n. When there is a cell outputted from the variable wavelength filter B 2931, only the cells of wavelength to be outputted are outputted to a cell output line 841 and the cells of the other wavelengths are not allowed to pass in the variable wavelength filter B, and the cells of wavelengths other than the cells to be outputted are passed and outputted to the cell demultiplexer portion 802 at the succeeding stage in the variable wavelength filter A 2921. When the output from the variable wavelength filter B 2931 is terminated, the control portion determines a cell to be outputted in the next place.

Through the operation described in the above, it is possible to take out cells from data in which no synchronization is obtained among cells and to align them in a line by the time base.

Further, since the DMX portion of the present embodiment handles wavelength division multiplexed cells in which phases are not uniform, the DMX portion is operable even when the spacing between inputted cells is not constant for the input of cells having the same wavelength such as cells X-0 and X-1 shown in FIG. 26.

The cells thus processed are converted into wavelengths for output corresponding to the outgoing line 117 in the wavelength converter 116 and are outputted to the outgoing line.

According to the present embodiment, the routing information is analyzed by the header converters, 112 to 1n2, and the filter portions, 113 to 1n3, indicate output routes of respective cells based on the routing information, thereby to make it possible to perform switching. Further, in the multiplexers, 2114 to 21n4, a plurality of cells in which the fronts of the cells arriving from the filter portions, 113 to 1n3, of respective incoming lines are not uniform are wavelength division multiplexed in the multiplexers, 2114 to 21n4, the cells are split from the multiplexed data in order as received earlier and are aligned in a line by the time base in the DMX portions, 2115 to 21n5, and various wavelengths of the cells are converted into a single output wavelength corresponding to the outgoing line.

As described in the above, it is possible to construct a system in which cells are wavelength division multiplexed by switching communication information as it is an optical signal based on the routing information contained in the header portion among a plurality of incoming lines and a plurality of outgoing lines without obtaining synchronization among respective input cells using fixed length cells each composed of the header portion and the data portion.

Further, an example in which functions of the DMX portion and the wavelength converter are provided in the switching system is mentioned in the present embodiment, but these functions may also be provided in terminals as shown in FIG. 27. In this case, it is possible to construct an optical switching system featured by that wavelength division multiplexed data are outputted as they are and multiplexed data are split on terminal sides so as to take out required data.

According to the present embodiment, it is possible to construct a system in which fixed length cells each composed of a header portion and a data portion are used, and the cells are wavelength division multiplexed by switching communication information as it is an optical signal among a plurality of incoming lines and a plurality of outgoing lines based on the routing information contained in the header portions without obtaining synchronization among respective input cells. In addition, a circuit required for synchronization of cells such as an optical memory becomes unnecessary since phase synchronization of cells is not required.

We claim:

1. An optical switching system in which a plurality of input transmission lines and a plurality of output transmission lines for transmitting optical signals are arranged and connected, fixed length cells each composed of a header portion and a data portion transmitted from said input transmission lines are switched based on the routing information contained in the header portions of said cells and outputted to said output transmission lines, comprising:

means for taking out routing information of said header portion; controlling a plurality of wavelength filter portions based on said routing information and outputting said cells to an output route;

means for wavelength division multiplexing cells having different wavelengths and different phases which have arrived at output routes from said plurality of wavelength filter portions; and means for realigning wavelength division multiplexed cells in a line by the time base regardless of the wavelength on said output route.

2. A cell demultiplexer circuit which is means for splitting cells from data in which a plurality of cells having different wavelengths and different phases are wavelength division multiplexed, comprising:

a plurality of cell demultiplexer portions for inputting wavelength division multiplexed cells and outputting them to two outputs selectively; and control portions connected to said plurality of cell demultiplexer portions, respectively, for instructing the wavelength of the cell to be outputted by said cell demultiplexer portion through a control line; wherein:

a cell outputted from one output of said cell demultiplexer portion is inputted to another cell demultiplexer portion through a delay line, and in the cells outputted from the other output of said cell demultiplexer portion, only one cell having the wavelength instructed by the controller portion is outputted by a variable wavelength filter in said cell demultiplexer portion.

3. An optical switching system in which a plurality of input transmission lines and a plurality of output transmission lines for transmitting optical signals are arranged and connected, fixed length cells each composed of a header portion and a data portion transmitted from said input transmission lines are switched based on the routing information contained in the header portions of said cells and outputting the switched cells to said output transmission lines, comprising:

means for taking out routing information of the header portions, controlling the wavelength filter portions in accordance with said information and outputting the cells to output routes; and means for wavelength division multiplexing cells having different wavelengths and different phases which have arrived at output routes from said plurality of wavelength filter portions; wherein:

an optical speech path which outputs the cells in a multiplex state without aligning the cells in a line by the time base from the wavelength division multiplexed cells, and the wavelength division multiplexed data are split on a terminal side so as to take out the data required by the terminals.

* * * * *